United States Patent
Haartsen

(10) Patent No.: US 10,206,194 B1
(45) Date of Patent: Feb. 12, 2019

(54) NARROWBAND SINGLE BASE LOCATION SYSTEM

(71) Applicant: Plantronics, Inc., Santa Cruz, CA (US)

(72) Inventor: Jacobus Cornelis Haartsen, Rolde (NL)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/834,948

(22) Filed: Dec. 7, 2017

(51) Int. Cl.
| | |
|---|---|
| H04W 64/00 | (2009.01) |
| H04W 8/00 | (2009.01) |
| H04W 24/10 | (2009.01) |
| H04W 72/04 | (2009.01) |
| H04W 76/14 | (2018.01) |
| H04W 4/80 | (2018.01) |

(52) U.S. Cl.
CPC .......... *H04W 64/003* (2013.01); *H04W 4/80* (2018.02); *H04W 8/005* (2013.01); *H04W 24/10* (2013.01); *H04W 76/14* (2018.02); *H04W 72/0453* (2013.01)

(58) Field of Classification Search
CPC ..... H04W 64/003; H04W 76/14; H04W 4/80; H04W 8/005; H04W 24/10; H04W 72/0453
USPC ...... 455/23, 41.2, 42, 60, 67.16, 139, 180.3, 455/205, 260, 276.1, 304, 404.2, 455/456.1–457
See application file for complete search history.

(56) References Cited

U.S. PATENT DOCUMENTS

| | | | | |
|---|---|---|---|---|
| 6,459,903 | B1 * | 10/2002 | Lee | H04W 64/00 342/457 |
| 7,567,627 | B1 * | 7/2009 | Fraundorfer | G01S 5/0221 375/316 |
| 2013/0321209 | A1 * | 12/2013 | Kalliola | G01S 5/02 342/419 |
| 2017/0201859 | A1 * | 7/2017 | Banerjea | H04W 4/80 |
| 2018/0077589 | A1 * | 3/2018 | Jarvis | H04W 24/08 |
| 2018/0267131 | A1 * | 9/2018 | Simileysky | G01S 3/48 |

OTHER PUBLICATIONS

Haartsen et al., Narrowband RF Distance Measurement Using Phase Locked FM Transceivers, 2016 Symposium on Communications and Vehicular Technologies (SCVT), Nov. 22, 2016, 6 pages, Mons, Belgium.

(Continued)

*Primary Examiner* — Michael Y Mapa
(74) *Attorney, Agent, or Firm* — Chuang Intellectual Property Law

(57) ABSTRACT

Methods and apparatuses for device location are described. In one example embodiment, an apparatus and method for determining a location of a mobile device is presented using a single narrowband radio system. In one implementation, Bluetooth is utilized. Using the single base operating with the narrowband radio, the location of the mobile device is found by applying both angle determination and distance determination. Using phased array antennas, the angle between receiver and base is determined. The distance is determined using a time-of-flight method based on phase comparison and phase lock loop techniques which can be applied in narrowband radio transceivers.

21 Claims, 22 Drawing Sheets

(56) References Cited

OTHER PUBLICATIONS

Horiba et al., "An Improved NLOS Detection Scheme for Hybrid-TOA/AOA-Based Localization in Indoor Environments," 2013 IEEE International Conference on Ultra-Wideband (ICUWB), Sep. 2013, pp. 37-42, 6 pages, Sydney, NSW, Australia.
Papakonstantinou et al., "Hybrid TOA/AOD/Doppler-Shift Localization Algorithm for NLOS Environments," 2009 IEEE 20$^{th}$ International Symposium on Personal, Indoor and Mobile Radio Communications, Sep. 2009, 5 pages, Tokyo, Japan.

\* cited by examiner

NARROWBAND SINGLE BASE LOCATION SYSTEM

BACKGROUND OF THE INVENTION

Global positioning systems (GPS) provide satellite based location services in devices such as smartphones for applications such as vehicle navigation. However, GPS has several limitations which prevent practical application in other areas. For example, GPS satellite services work less well indoors due to the attenuation of the GPS radio signals. Furthermore, the accuracy provided by GPS is on the scale of approximately ten meters. While sufficient in applications such as vehicle navigation, this accuracy is insufficient in other applications. For example, in many indoor use applications, accuracy on the scale of approximately one meter is desired.

Received signal strength indication (RSSI) based location techniques have been used. As the radio signals propagate, their power strength decreases as the distance increases. When the transmit power is known, the received power gives an indication about the distance travelled. However, RSSI provides only a distance. In order to obtain a position, multiple transmitters with known locations are needed to perform triangulation or trilateration. Furthermore, the RSSI measurements are heavily disturbed by environmental effects such as multipath fading and shadow fading. In particular, shadow fading, which is caused by additional attenuation in the signal path (e.g., a human body), makes the RSSI technique quite inaccurate for positioning applications.

As a result, improved methods and apparatuses for device location are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
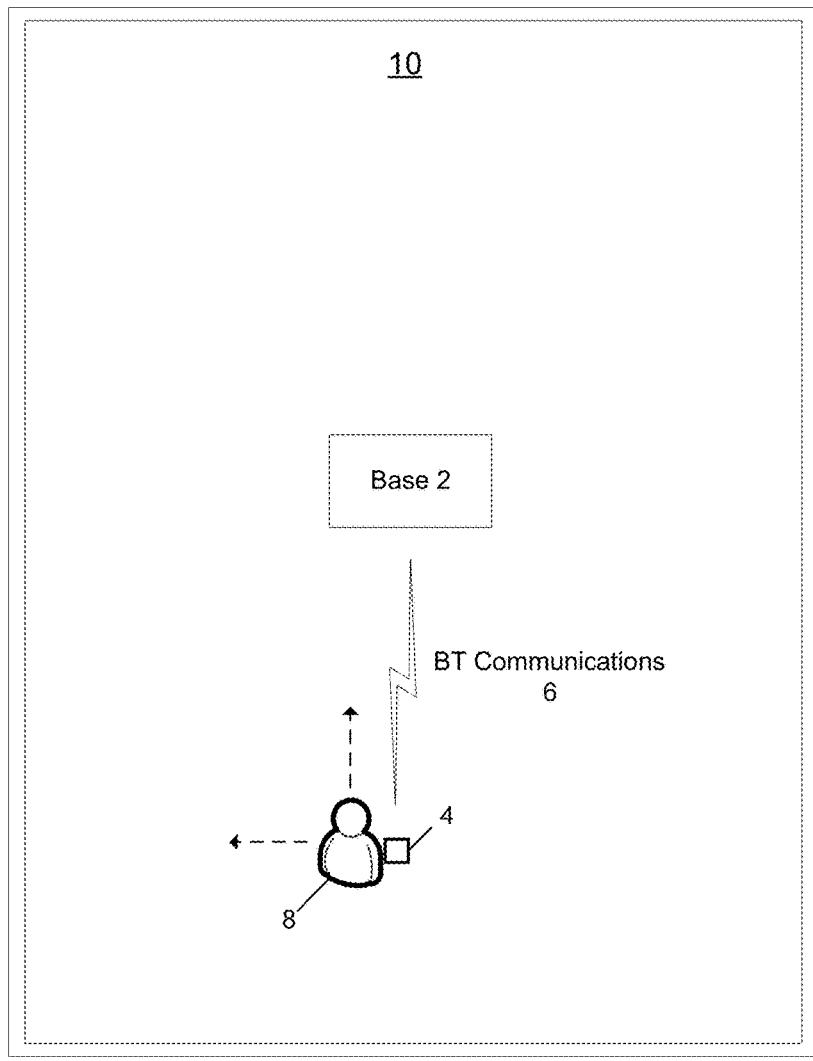
FIG. 1 illustrates a location system including a Bluetooth base and a Bluetooth user mobile device.

Methods and apparatuses for enhanced narrowband device location are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various examples of the invention, although different, are not necessarily mutually exclusive. Thus, a particular feature, characteristic, or structure described in one example embodiment may be included within other embodiments unless otherwise noted.

The inventor has recognized certain limitations in current methods for accurately determining the location of devices. In one example embodiment, an apparatus and method for determining a location of a mobile user or device in indoor environment within 0.5 m accuracy using a single, narrowband radio system is presented. In radio, narrowband describes a channel in which the bandwidth of the message does not significantly exceed the channel's coherence bandwidth. In one implementation, Bluetooth is utilized. Using a single base operating with a narrowband radio, the location of the mobile device is found by applying both angle determination and distance determination. Using phased array antennas, a receiver at the user mobile device determines the angle to a transmitter at the base. With a phased array antenna at the receiver of a user mobile device, the angle of arrival (AoA) can be determined; with a phased array antenna at the transmitter of a base, the angle of departure (AoD) can be determined. The distance is determined using a time-of-flight (ToF) method based on phase comparison and Phase Lock Loop techniques which can be applied in ordinary narrowband radio transceivers like Bluetooth. The time it takes for the signal to travel from the transmitter to the receiver is measured using phase measurements. Advantageously, a wideband or UltraWideB and system typically used for distance measurements is not required to provide accurate indoor positioning results. UWB is a system with a fractional bandwidth larger than 20% or an absolute bandwidth larger than 500 MHz. In one example, the methods described herein use the Bluetooth channel which has a bandwidth in the order of 1 to 2 MHz (on a 2.4 GHz carrier, this is a fractional bandwidth of less than 0.1%. The angle measurement determines a line at a certain angle with respect to the base. The distance measurement determines a circle with a certain radius with respect to the base. The cross point of the line with the circle determines the position of the user mobile device.

Advantageously, only a single base is required. In order to obtain the device position, multiple transmitters with known locations are not required as triangulation or trilateration techniques are not utilized. For example, the location of a device A is determined relative to the location of a device B without the intervention of a device C. Since a single radio technology is used for communications, angle determination, and distance determination, advantageously, a simple, low-power and low-cost solution for indoor positioning is obtained. This also allows for greater ease of implementation.

In one example embodiment, a method includes determining an angle and determining a distance between a first Bluetooth device and a second Bluetooth device. Determining the angle includes transmitting between a first Bluetooth device and a second Bluetooth device one or more Bluetooth Low Energy (BLE) communications packets including a continuous wave operable to identify a transmission AoD or received AoA. In one example, the first Bluetooth device is a base device and the second Bluetooth device is a user mobile wireless device. In a further example, the first Bluetooth device is a user mobile wireless device and the second Bluetooth device is a base device. In one example, the one or more BLE communications packets include the continuous wave transmitted from at least a first antenna and a second antenna, whereby the first antenna and the second antenna are switched during transmission of the continuous wave.

The one or more BLE communications packets are sampled at the first Bluetooth device or the second Bluetooth device to derive the transmission AoD or received AoA. In one example, sampling the one or more BLE communications packets includes receiving the continuous wave at a first antenna and a second antenna, the first antenna and the second antenna switched during receipt of the continuous wave.

To determine the distance, a first radio frequency (RF) carrier is modulated with a first low frequency modulating signal to generate a first frequency modulated RF carrier signal. The method includes transmitting from the second Bluetooth device to the first Bluetooth device one or more BLE communications packets including the first frequency modulated RF carrier signal. The first frequency modulated RF carrier signal is demodulated at the first Bluetooth device.

The method includes phase locking at the first Bluetooth device to the first low frequency modulating signal and generating a second frequency modulated RF carrier signal with a second low frequency modulating signal. This may include phase locking a voltage controlled oscillator at the first Bluetooth device to the first low frequency modulating signal, storing a phase of the first low frequency modulating signal in the voltage controlled oscillator that is phase locked to the first low frequency modulating signal, and modulating a second RF carrier with the second low frequency modulating signal utilizing the phase stored in the voltage controlled oscillator at the first Bluetooth device to generate the second frequency modulated RF carrier signal.

The method further includes transmitting from the first Bluetooth device to the second Bluetooth device one or more BLE communications packets including the second frequency modulated RF carrier signal. The second frequency modulated RF carrier signal is demodulated at the second Bluetooth device. A distance between the first Bluetooth device and the second Bluetooth device is determined by comparing a phase of the first low frequency modulating signal to a phase of the second low frequency modulating signal. A relative location of the second Bluetooth device to the first Bluetooth device is determined utilizing the transmission AoD or received AoA and the distance between the first Bluetooth device and the second Bluetooth device.

In one example embodiment, a method for determining a location of a Bluetooth device includes receiving at a second Bluetooth device from a first Bluetooth device one or more BLE communications packets including a continuous wave operable to identify a transmission AoD from the first Bluetooth device or AoA at the second Bluetooth device. The one or more BLE communications packets are sampled at the second Bluetooth device to derive the transmission AoD from the first Bluetooth device or AoA at the second Bluetooth device.

A first RF carrier is modulated with a first low frequency modulating signal to generate a first frequency modulated RF carrier signal. The method includes transmitting from the second Bluetooth device to the first Bluetooth device one or more BLE communications packets including the first frequency modulated RF carrier signal.

The method further includes receiving at the second Bluetooth device from the first Bluetooth device one or more BLE communications packets including a second frequency modulated RF carrier signal. This second frequency modulated RF carrier signal is generated at the first Bluetooth device by phase locking at the first Bluetooth device to the first low frequency modulating signal and utilizing a second low frequency modulating signal. The second frequency modulated RF carrier signal is demodulated at the second Bluetooth device. A distance between the first Bluetooth device and the second Bluetooth device is determined by comparing a phase of the first low frequency modulating signal to a phase of the second low frequency modulating signal. A relative location of the second Bluetooth device to the first Bluetooth device is determined utilizing (1) the transmission AoD from the first Bluetooth device or AoA at the second Bluetooth device, and (2) the distance between the first Bluetooth device and the second Bluetooth device.

In one example embodiment, a user mobile device includes a user interface, a power source, a first antenna, a second antenna, a Bluetooth transmitter operable to transmit Bluetooth communications packets on the first antenna or the second antenna, a Bluetooth receiver operable to receive Bluetooth communications packets on the first antenna or the second antenna, and a processor. The user mobile device includes a memory including a location application executable by the processor to perform operations. The operations include switching between the first antenna and the second antenna while receiving at the Bluetooth receiver from a remote Bluetooth device one or more BLE communications packets including a continuous wave. The operations include determining the transmission AoD from the remote Bluetooth device or AoA at the user mobile device from the one or more BLE communications packets. The operations further include modulating a first RF carrier with a first low frequency modulating signal to generate a first frequency modulated RF carrier signal, and transmitting utilizing the Bluetooth transmitter one or more BLE communications packets including the first frequency modulated RF carrier signal to the remote Bluetooth device.

The operations include receiving at the Bluetooth receiver from the remote Bluetooth device one or more BLE communications packets including the second frequency modulated RF carrier signal, the second frequency modulated RF carrier signal generated at the remote Bluetooth device by phase locking at the remote Bluetooth device to the first low frequency modulating signal and utilizing a second low frequency modulating signal. The operations include demodulating the second frequency modulated RF carrier signal at the user mobile device. The operations further include determining a distance between the remote Bluetooth device and the user mobile device by comparing a phase of the first low frequency modulating signal to a phase of the second low frequency modulating signal. The operations further include determining a relative location of the user mobile device to the remote Bluetooth device by (1) utilizing the transmission AoD from the remote Bluetooth device or AoA at the user mobile device, and (2) the distance between the remote Bluetooth device and the user mobile device.

In one example embodiment, a single transmission is utilized to perform both the angle and the distance measurement. For example, one method for this single-mode distance and angle detection includes modulating a first RF carrier with a first low frequency modulating signal to generate a first frequency modulated RF carrier signal at a first narrowband radio device. The method includes transmitting from the first narrowband radio device to a second narrowband radio device one or more communications packets comprising the first frequency modulated RF carrier signal.

The first frequency modulated RF carrier signal is demodulated at the second narrowband radio device. The method further includes phase locking at the second narrowband radio device to the first low frequency modulating signal and generating a second frequency modulated RF carrier signal with a second low frequency modulating signal which is phase locked to the first low frequency modulating signal.

One or more communications packets comprising the second frequency modulated RF carrier signal are transmitted from the second narrowband radio device to the first narrowband radio device. The second frequency modulated RF carrier signal is demodulated at the first narrowband radio device. The method includes determining a distance between the second narrowband radio device and the first narrowband radio device comprising comparing a phase of the first low frequency modulating signal to a phase of the second low frequency modulating signal.

In one example, the one or more communications packets comprising the first frequency modulated RF carrier signal are sampled at the second narrowband radio device to derive a transmission angle of departure or a received angle of arrival. In a further example the one or more communications packets comprising the second frequency modulated RF carrier signal are sampled at the first narrowband radio device to derive the transmission angle of departure or the received angle of arrival.

The method further includes determining a relative location of the first narrowband radio device to the second narrowband radio device utilizing the transmission angle of departure or the received angle of arrival and the distance between the second narrowband radio device and the first narrowband radio device.

FIG. 1 illustrates a location system including a Bluetooth base 2 and a Bluetooth user mobile device 4 in an area 10. For example, area 10 is an indoor space, such as an office building. In one example, the position of base 2 is fixed (i.e., not mobile) and known. Base 2 and user mobile device 4 are Bluetooth enabled and discoverable, and each have a different Bluetooth device address identifier such as a unique Bluetooth device address. In one example, base 2 and user mobile device 4 have a different Class of Device so that they can be distinguished from each other. Base 2 and user mobile device 4 are capable of Bluetooth communications 6 there between and may be connected together to a broader network or implemented as standalone devices.

In the example illustrated in FIG. 1, a user 8 carrying user mobile device 4 may move within area 10. Utilizing techniques described herein, the location of user mobile device 4 with respect to base 2 within area 10 is determined. If the position of base 2 within area 10 is fixed and known, then the location of user mobile device 4 within area 10 is therefore identified.

Figure 2:
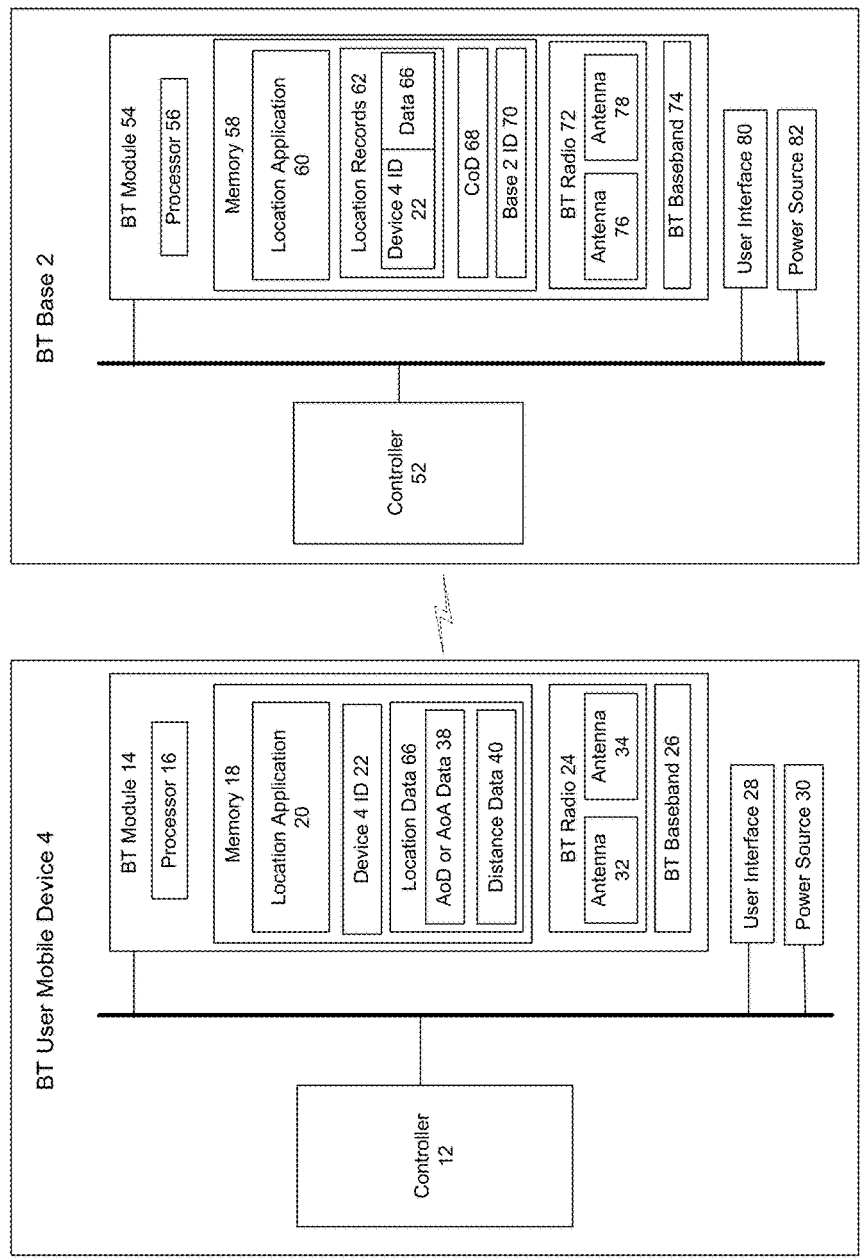
FIG. 2 illustrates a simplified block diagram of the system shown in FIG. 1.

FIG. 2 illustrates a simplified block diagram of the system shown in FIG. 1. Bluetooth user mobile device 4 includes a controller 12, Bluetooth module 14, user interface 28, and power source 30. For example, Bluetooth user mobile device 4 may be a mobile phone, headset, PDA, smartphone, portable computer, or other electronic device. Bluetooth module 14 includes a processor 16, Bluetooth radio 24, and Bluetooth baseband 26. Bluetooth module 14 also includes a memory 18 storing a location application 20 and user mobile device 4 identifier 22. For example, identifier 22 may be the Bluetooth device address (BD_ADDR) of Bluetooth user mobile device 4. The Bluetooth device address is a unique 48-bit IEEE address and enables unique identification of Bluetooth user mobile device 4. Processor 16 executes the programs stored in memory 18.

Memory 18 stores location data 66. The location data 66 includes, for example, AoD or AoA data 38 and distance data 40. Angle of departure or AoA data 38 and distance data 40 may be determined at either user mobile device 4 or base 2 as described herein. At user mobile device 4, for example, location application 20 stores location data 66 such that it may be read by base 2.

Bluetooth radio 24 includes a switchable first antenna 32 and a second antenna 34, and may be implemented on a separate chip. In one example, antenna 32 and antenna 34 are coupled to Bluetooth radio 24 via an antenna port. Bluetooth radio 24 includes a Bluetooth compatible transmitter modulator and a Bluetooth compatible receiver modulator. Bluetooth radio 24 is configured to transmit or receive voice or data packets via antenna 32 or antenna 34.

Processor 16 may include a variety of processors (e.g., digital signal processors), with conventional CPUs being applicable. Memory 58 may include a variety of memories, and in one example includes RAM, ROM, flash memory, or a combination thereof. Memory 18 may further include separate memory structures or a single integrated memory structure. One or more components of Bluetooth module 14 may be integrated with other components at Bluetooth user mobile device 4.

Bluetooth base 2 includes a controller 52, Bluetooth module 54, user interface 80, and power source 82. Bluetooth module 54 includes a processor 56, Bluetooth radio 72, and Bluetooth baseband 74. Bluetooth module 54 also includes a memory 58 storing a location application 60, Class of Device (CoD) 68, and Bluetooth base 2 identifier 70. For example, base 2 identifier 70 may be the Bluetooth device address (BD_ADDR) of Bluetooth base 2. Processor 56 executes programs stored in memory 58. Bluetooth radio 72 includes components and operates similar to Bluetooth radio 24 described above, including a switchable antenna 76 and antenna 78. Bluetooth radio 72 includes a Bluetooth compatible transmitter modulator and a Bluetooth compatible receiver modulator. Bluetooth radio 72 is configured to transmit or receive voice or data packets via antenna 76 or antenna 78. Bluetooth base 2 periodically scans for other devices in its neighborhood and processes discovered devices as described herein.

The Bluetooth Class of Device 68 is programmed into the base 2 firmware and not variable. The Bluetooth COD Field includes a major class, minor class, and service type. In one example, the Class of Device of Bluetooth base 2 is defined to be a unique identifier.

Memory 58 stores location records 62. In one example, location application 60 stores data 66 in the location records 62 which may be read by Bluetooth user mobile device 4. The data 66 is stored in the location records 62 with the user mobile device 4 identifier 22.

In one example, Bluetooth user mobile device 4 may search the Bluetooth location records 62, where the searching includes identifying device 4 identifier 22 and reading location data 66 in the entry from the Bluetooth location records 62. The data 66 stored with device 4 identifier 22 in the location records 62 may vary based on the particular usage application of Bluetooth user mobile device 4 and Bluetooth base 2. Several example usage applications are described herein, but one of ordinary skill in the art will recognize that location data 66 is not limited to these examples. In the examples described herein, location data 66 may be AoD or AoA data 38 and distance data 40. Location data 66, including AoD or AoA data 38 and distance data 40, may be processed at user mobile device 4, base 2, or elsewhere to generate presence and location information about user 8.

In one example operation, one or more BLE communications packets including a continuous wave operable to identify a transmission AoD or received AoA are transmitted between base 2 and mobile device 4. The one or more BLE communications packets are sampled at the base 2 or the mobile device 4 to derive the transmission AoD or received AoA.

In one embodiment, base 2 transmits the BLE communications packets to the mobile device 4. The BLE communications packets include the continuous wave transmitted from antenna 76 and antenna 78, where the antenna 76 and antenna 78 switched during transmission of the continuous wave. The received BLE communications packets are sampled at the mobile device 4 to derive the transmission AoD from the base 2.

Figure 4:
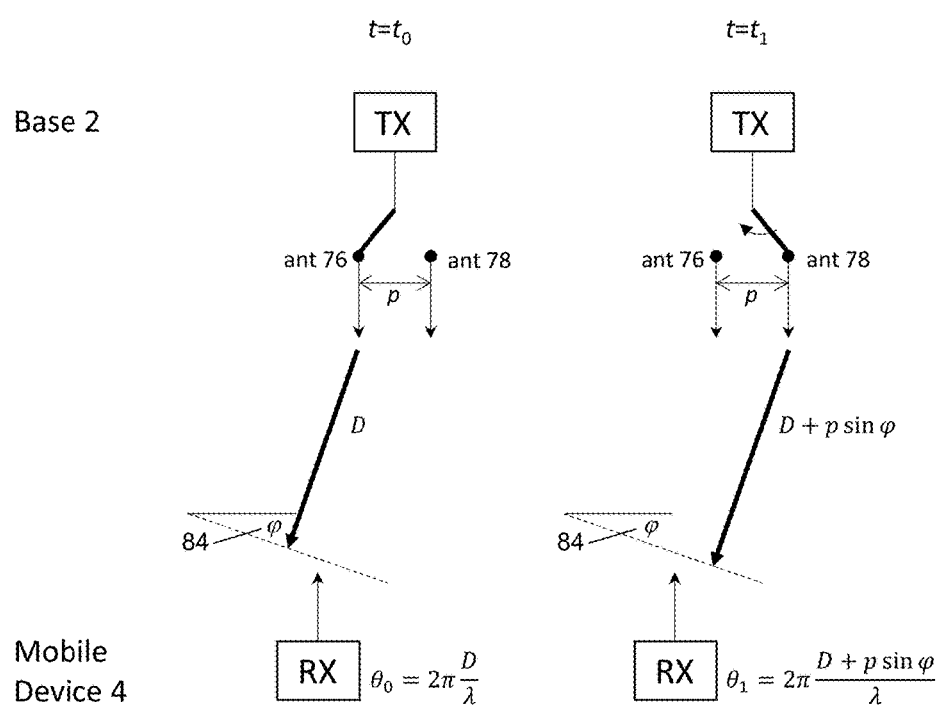
FIG. 4 illustrates determination of angle of departure using Bluetooth communications.

FIG. 4 illustrates determination of the AoD using Bluetooth communications. To apply an AoD (or AoA) measurement and a ToF measurement at the mobile device 4, the same narrowband radio technology (e.g., Bluetooth) is used that is also used for data communications (e.g., audio communications). In case of AoD, the transmitter (i.e., base 2) sequentially sends a continuous wave (CW) signal on different antenna elements of the phase array antenna. At $t=t_0$, the transmitter uses the first antenna element antenna 76 to send a constant sinusoidal wave. The RF phase angle based on the delay is $\theta_0$. Then without interrupting the transmission of the sinusoidal wave, the transmitter switches to the second antenna element antenna 78. From the difference in received phase angle $\theta_1-\theta_0$ and the (known) separation p between the antenna elements, the angle φ84 between the mobile device 4 and the base 2 can be determined:

$$\varphi = \sin^{-1}\left(\frac{\lambda}{2\pi p}(\theta_1 - \theta_0)\right)$$

For an AoA measurement, a similar technique can be used with the difference that now the phased array antenna is at the mobile device 4, and the mobile device 4 switches between the different antenna elements.

Figures 5A, 5B:
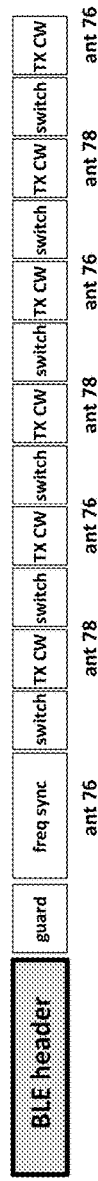
FIG. 5A illustrates a specialized packet sent by the base for an angle of departure measurement in one example.
FIG. 5B illustrates a specialized packet sent by the base with supplemental payload for an angle of arrival measurement at mobile device in one example.

FIG. 5A illustrates a specialized packet 88 sent by the base 2 for an AoD measurement in one example. After an ordinary BLE header, a supplemental payload 92 is sent specifically for the AoD measurement. In the frequency synchronization part is a reference signal to allow the receiver to setup the I/Q sampling. In one example, packet 88 includes a primary payload to which supplemental payload 92 is appended. The primary payload is 144 bits, and includes supporting data for supplemental payload 92. For example, the primary payload includes data associated with the supplemental payload 92 field, including its length. The primary payload may also include supporting data for the AoD algorithm, including data associated with transmit power and transmit interval.

Thereafter the transmitter switches between the antenna elements 76 and 78. Although only two antenna elements are shown, more elements may be present. In one example, an antenna pair consisting of antennas at 90 degrees with respect to one another is used for three dimensional determinations. The signal provided by the transmitter to the antenna (i.e., before switching between elements) is a continuous wave signal (e.g., a sinusoid). At mobile device 4, the supplemental payload 92 is sampled to determine the AoD, i.e., by sampling the phase and amplitude of the reference continuous wave signal in supplemental payload 92.

Figure 11:
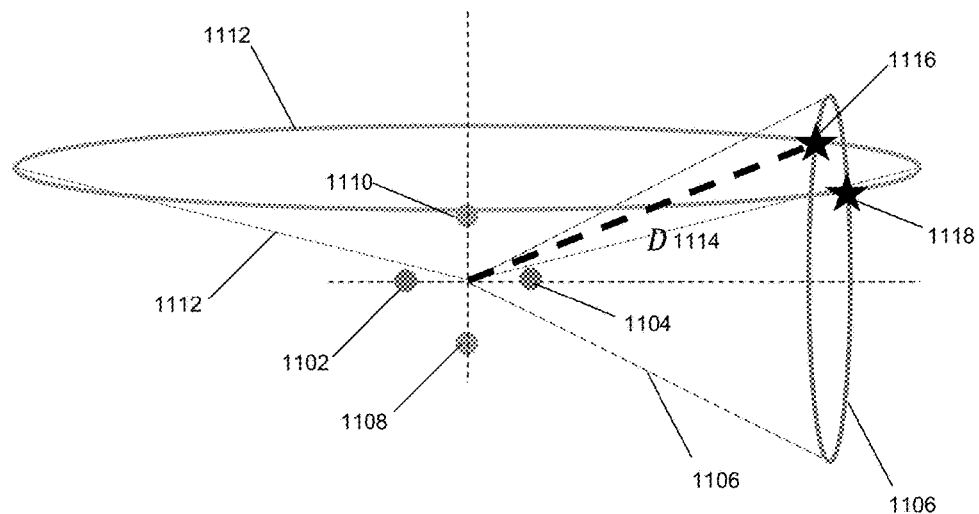
FIG. 11 illustrates an example of a duo array antenna providing two cross points.
Figure 12:
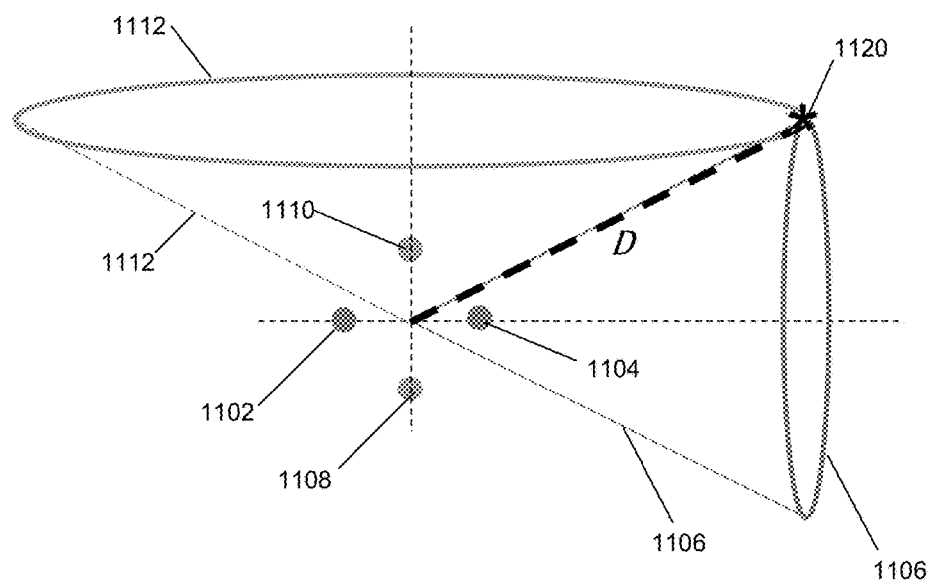
FIG. 12 illustrates an example of a duo array antenna with mobile device in the same plane of antenna elements, providing a single cross point.

For three dimensional determinations, FIG. 11 illustrates an example of a duo array antenna providing two cross points. A single array antenna consisting of two or more (centered) omni-directional antenna elements creates a cone. On each position on the cone, an angle measurement would render the same results. By introducing two or multiple array antennas (not centered along the same axis), multiple cones result, the cross-section of which will determine the true position of the mobile device 4. For example, in FIG. 11 two array antennas positioned perpendicular to each other are shown. The antenna elements 1102 and 1104 create the cone 1106; the antenna elements 1108 and 1110 create the cone 1112. The distance radius D 1114 is presented by the dashed line. The cones 1106 and 1112 will cross at two points 1116 and 1118 indicating potential locations of mobile device 4. Usually, one of the points can be ignored. For example, when the array antennas would be in the 2D plane of a building ceiling, only one point 1116 or 1118 would be below the ceiling (the other point would be above the ceiling and can be ignored). In the special case that the mobile device 4 is in the same plane as the antenna elements, the two cones 1106 and 1112 align and only a single cross point 1120 results. FIG. 12 illustrates an example of a duo array antenna with mobile device 4 in the same plane of antenna elements, providing a single cross point 1120.

In an alternative example, base 2 transmits to mobile device 4 a continuous wave using only a single antenna 76. FIG. 5B illustrates a specialized packet 94 sent by the base 2 with supplemental payload 96 for an AoA measurement at mobile device 4 in one example. Mobile device 4 receives the continuous wave at antenna 32 and antenna 34. The antenna 32 and antenna 34 are switched during receipt of the continuous wave and the AoA determined. Alternatively, two radio receiver sections are used connected to antenna 32 and antenna 34, respectively, whose outputs are combined to determine the AoA.

In an alternative example, the roles of base 2 and mobile device 4 described in FIGS. 3-7 above are reversed. For example, mobile device 4 transmits communications packets including a continuous wave transmitted from antenna 32 and antenna 34, the antenna 32 and antenna 34 switched during transmission of the continuous wave. The received BLE communications packets are sampled at the base 2 to derive the transmission AoD from the mobile device 4. Other described processes above are similarly reversed.

Following determination of the AoD or AoA, the distance between base 2 and mobile device 4 is determined. At mobile device 4, a first RF carrier is modulated with a first low frequency modulating signal to generate a first frequency modulated RF carrier signal. For example, the first low frequency modulating signal is a 100-200 kHz signal. In one example, the upper limit of the low frequency modulating signal is determined by what the (narrowband) radio can handle. For example in BLE, 250 kHz is the maximum modulating frequency. The wave length of the modulating signal should be large enough so that no phase ambiguities occur when moving. As the distance changes over one wave length, the phase rotates over 360 degrees. For a proper measurement, the phase difference should be much smaller than 360 degrees. To say it differently: the distance measured should be much smaller than the wave length. So the wave length sets the maximum range of the measurement setup. As an example, the high-frequency 2.4 GHz signal has a wave length of 12.5 cm. For 1 m movement, the same phase difference is found 8 times. In contrast, a low-frequency 100 kHz signal has a wave length of 3 km. So there are no ambiguities in typical distance measurements of say 10-20 m maximum when the phase of the low-frequency 100 kHz modulating signal is used for the distance measurement. Mobile device 4 transmits to base 2 one or more BLE communications packets including the first frequency modulated RF carrier signal. The first frequency modulated RF carrier signal is transmitted in the supplemental payload of the BLE communications packet. The received first frequency modulated RF carrier signal at the base 2 is demodulated.

At base 2, the first low frequency modulating signal is phase locked to and a second frequency modulated RF carrier signal is generated with a second low frequency modulating signal. For example, the second low frequency modulating signal is a 100-200 kHz signal. In one example, this process includes phase locking a voltage controlled oscillator (VCO) at the base 2 to the first low frequency modulating signal. A phase of the first low frequency modulating signal in the voltage controlled oscillator that is phase locked to the first low frequency modulating signal is stored. A second RF carrier is modulated with a second low frequency modulating signal utilizing the phase stored in the voltage controlled oscillator at the base 2 to generate a second frequency modulated RF carrier signal.

Base 2 transmits to the mobile device 4 one or more BLE communications packets including the second frequency modulated RF carrier signal. The second frequency modulated RF carrier signal is transmitted in the supplemental payload of the BLE communications packet. The second frequency modulated RF carrier signal is demodulated at the mobile device 4. A distance between the base 2 and the mobile device 4 is determined by comparing a phase of the first low frequency modulating signal to a phase of the second low frequency modulating signal.

Figure 6:
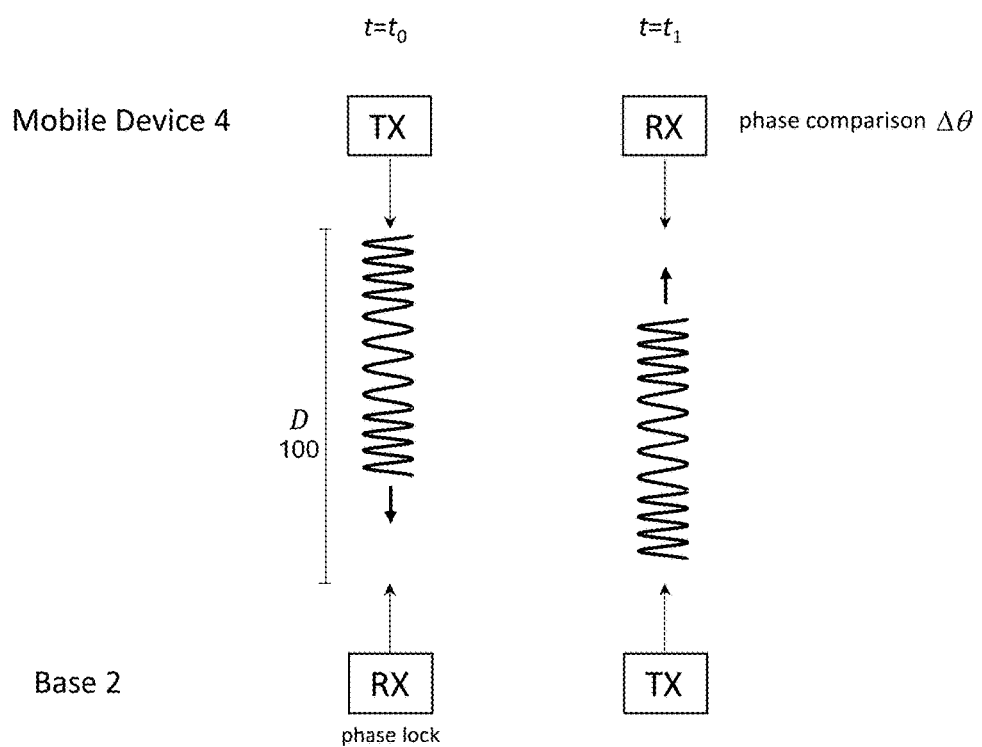
FIG. 6 illustrates a narrowband time-of-flight measurement technique in one example.

FIG. 6 illustrates this narrowband ToF measurement technique in one example. The narrowband ToF measurement technique is based on phase locking the base 2 to the mobile device 4. A periodic wave at relatively low frequency (e.g., 200 kHz) frequency-modulates (FM) the RF carrier at 2.4 GHz. At time $t=t_0$, the mobile device 4 transmits this FM signal to the base 2. The base 2 demodulates the RF carrier and locks its low-frequency VCO to the incoming 200 kHz modulating signal. Then, at time $t=t_1$, the base 2 uses the phase stored (locked) in its VCO to, in its turn, modulate a 2.4 GHz carrier and sends this modulated RF signal back to the mobile device 4. The mobile device 4 compares the phase in the 200 kHz signal it transmitted with the phase in the 200 kHz signal it receives; the phase difference is a measure for the distance D 100 traveled:

$$D = \frac{\Delta\theta}{2\pi f_m}$$

Figure 7:
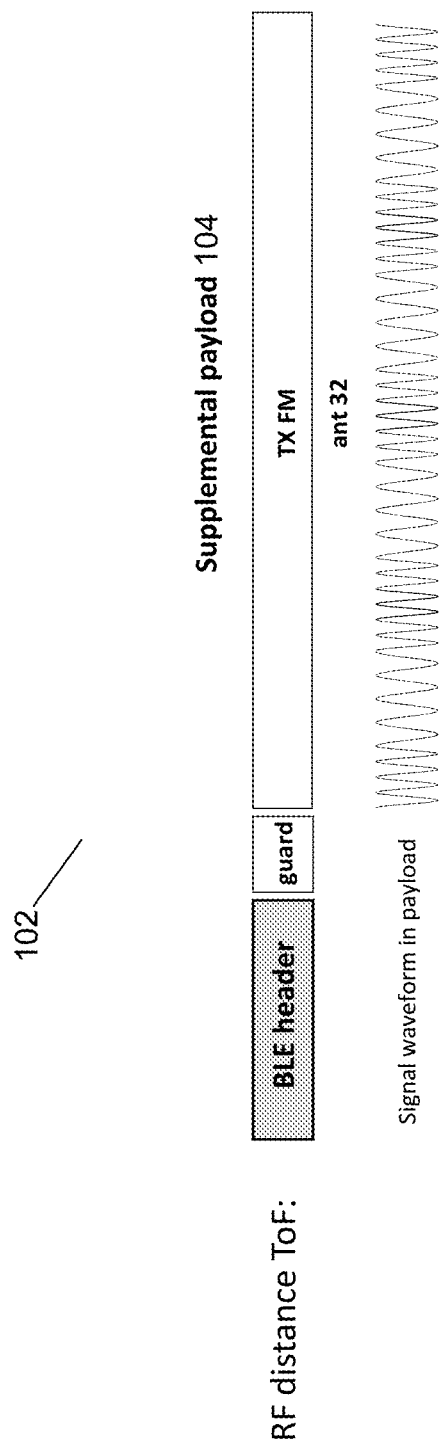
FIG. 7 is a specialized packet illustrating the packet format of the Bluetooth Low Energy transmitter for radio frequency distance measurement in one example.

FIG. 7 is a specialized packet 102 illustrating the packet format of the BLE transmitter for RF distance measurement in one example. The FM signal is narrowband (i.e. fits inside the bandwidth of BLE). The accuracy of the method depends on the energy in the packet. The energy can simply be increased by using a longer payload. The packet format is similar as in the AoD and AoA methods, only the supplemental payload 104 differs slightly.

Figure 3:
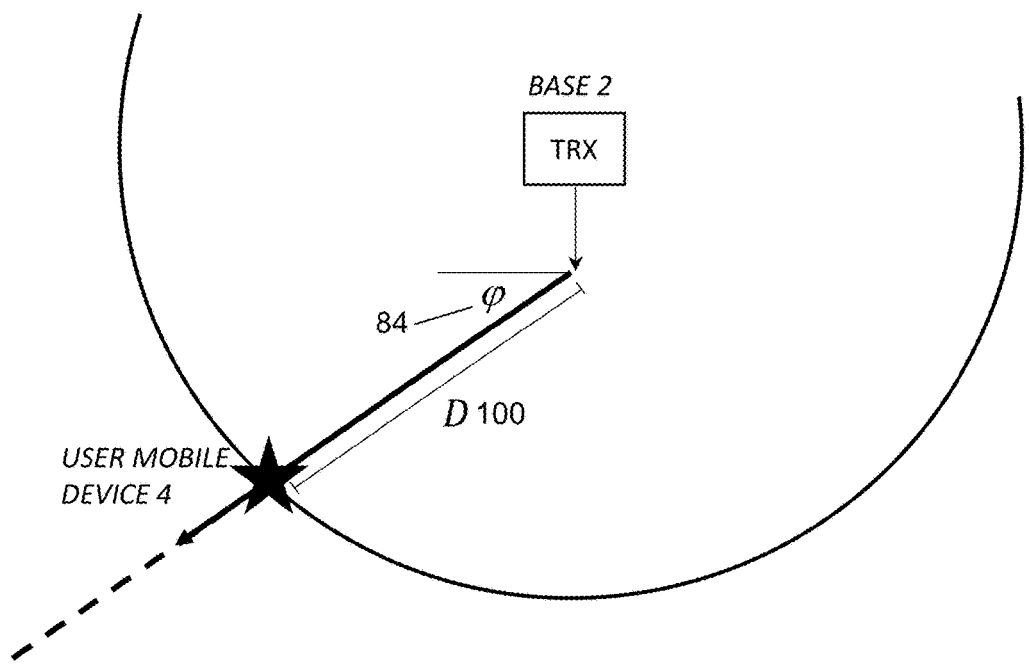
FIG. 3 illustrates determination of the relative location of the mobile device using only a single base.

The relative location of the mobile device 4 to the base 2 is determined utilizing the transmission AoD or received AoA and the distance between the base 2 and the mobile device 4. FIG. 3 illustrates determination of the relative location of the mobile device 4 using only a single base 2. The AoD or AoA measurement determines a line at a certain angle φ84 with respect to the base 2. The distance measurement determines a circle with a certain radius D 100 with respect to the base 2. The cross point of the line with the circle determines the mobile device 4 position. Advantageously, multiple bases to determine the position of mobile device 4 or not needed as required by systems utilizing triangulation or trilateration methodologies.

In an alternative example, the roles of base 2 and mobile device 4 described in FIG. 6 above are reversed. For example, a first RF carrier is modulated with a first low frequency modulating signal to generate a first frequency modulated RF carrier signal at base 2 instead of mobile device 4. Base 2 transmits to mobile device 4 one or more BLE communications packets including the first frequency modulated RF carrier signal. The received first frequency modulated RF carrier signal at the mobile device 4 is demodulated. At mobile device 4, the first low frequency modulating signal is phase locked to and a second frequency modulated RF carrier signal is generated with a second low frequency modulating signal. Mobile device 4 transmits to the base 2 one or more BLE communications packets including the second frequency modulated RF carrier signal.

The second frequency modulated RF carrier signal is transmitted in the supplemental payload of the BLE communications packet. The second frequency modulated RF carrier signal is demodulated at the base 2, which then determines distance D 100. Other described processes above are similarly reversed.

In one example operation, location application 20 and location application 60 are configured for and perform operations described herein by mobile device 4 and base 2, respectively. For example, in one embodiment location application 20 is configured for and performs operations including switching between the antenna 32 and the antenna 34 while receiving from the Bluetooth radio 24 from a base 2 one or more BLE communications packets including a continuous wave. Location application 20 determines the transmission AoD from the base 2 or AoA at the user mobile device 4 from the one or more BLE communications packets. Location application 20 modulates a first RF carrier with a first low frequency modulating signal to generate a first frequency modulated RF carrier signal. Location application 20 transmits utilizing the Bluetooth radio 24 one or more BLE communications packets including the first frequency modulated RF carrier signal to the base 2.

Location application 20 receives from Bluetooth radio 24 from the base 2 one or more BLE communications packets including the second frequency modulated RF carrier signal, the second frequency modulated RF carrier signal generated at the base 2 by phase locking at the base 2 to the first low frequency modulating signal and utilizing a second low frequency modulating signal. Location application 20 demodulates the second frequency modulated RF carrier signal at the user mobile device 4. Location application 20 determines a distance between the base 2 and the user mobile device 4 by comparing a phase of the first low frequency modulating signal to a phase of the second low frequency modulating signal. Location application 20 determines a relative location of the user mobile device 4 to the base 2 utilizing the transmission AoD from the base 2 or AoA at the user mobile device 4 and the distance between the base 2 and the user mobile device 4. In a further example, the roles of user mobile device 4 and base 2 are reversed, with functions performed by location application 20 at user mobile device 4 performed by location application 60 at base 2.

In one example, user mobile device 4 and/or base 2 are configured to communicate location information over communication networks to a remote server. The communication networks may be one or more networks, including cellular networks, WiFi networks, and the Internet. For example, the remote server may execute one or more application programs utilizing the location of user mobile device 4 within area 10. User mobile device 4 may transmit location data 66 to the remote server or base 2 may transmit one or more location records 62 to the remote server. User mobile device 4 may retrieve location data 66 from base 2 or vice versa.

In one example, the remote server is a presence or sound masking server. The presence or sound masking server processes the received location data to generate presence or sound masking information. Using a known location of the base 2, the presence or sound masking server can identify where the user 8 is within an area 10. In one example, user mobile device 4 includes a presence or sound masking application for interfacing with the presence or sound masking server.

In the examples above, measuring the distance and measuring the direction are separate activities which can be carried out sequentially. For the angle detection, a Continuous Wave (CW) carrier is used; for the distance detection, a frequency modulated (FM) or phase modulated (PM) waveform is used.

In a further example, the FM/PM waveform is also used for angle detection. As a result, instead of carrying out two measurements separately, the distance and angle are measured simultaneously. Although the FM/PM signal will introduce an extra phase rotation in the received signal which may interfere with the angle measurement (which needs a constant-frequency wave), the error can be compensated for since the FM/PM signal is known at the receiver.

Figure 13:
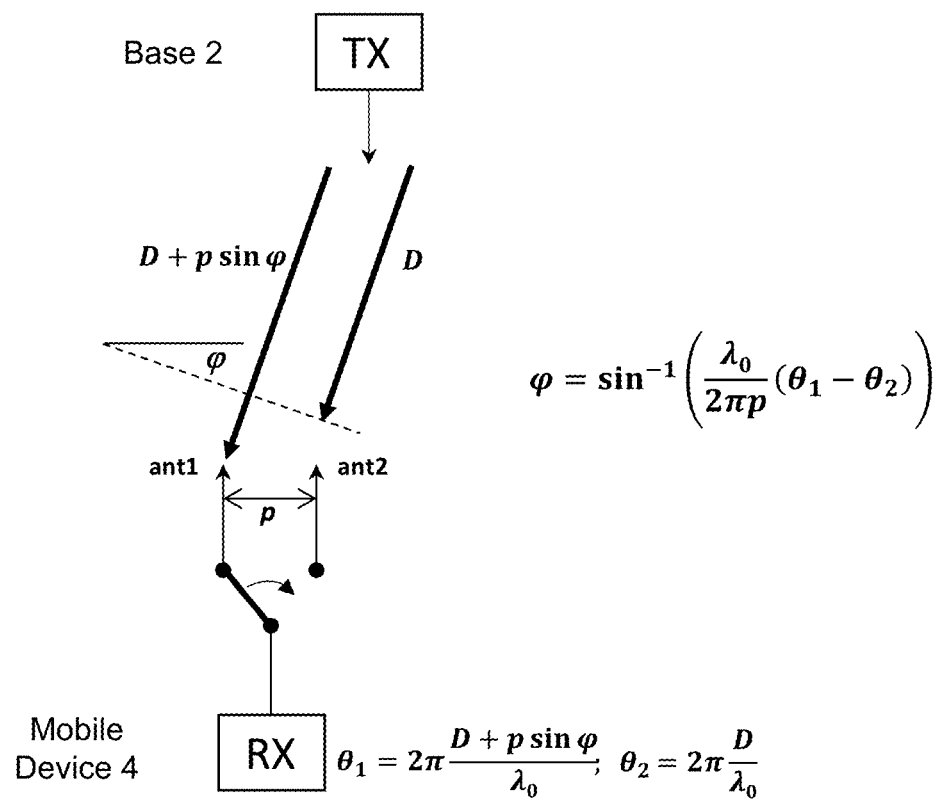
FIG. 13 illustrates a single-mode distance and angle detection method utilizing an AoA measurement.

FIG. 13 illustrates this single-mode distance and angle detection method utilizing an AoA measurement, though AoD can also be similarly utilized. If the carrier frequency $f_0$ is constant, the phase angles $\theta_1$ and $\theta_2$ are constant. However, if the frequency varies, like in FM or PM, the wavelength $\lambda_0 = c/f_0$ varies with time (c is the velocity of light).

Further examination of the signals received at antenna element 1 (ant1) and antenna element 2 (ant2) (e.g., antenna 32 and antenna 34 at mobile device 4) in FIG. 13 follows. Suppose the signal transmitted by the base is a PM signal $S_X(t)$:

$$S_{TX}(t) = \cos(\omega_0 t + A_m \sin(\omega_m t))$$

where $\omega_0$ is the carrier frequency at 2.4 GHz and $\omega_m$ is the modulating frequency. Typically, $\omega_m \ll \omega_0$ ($\omega_m = 100$ kHz and $\omega_0 = 2.4$ GHz). $A_m$ is the total phase swing.

The method introduces two delays: $t_D$ is the propagation delay over the distance D, and $\Delta t$ is caused by the angle $\varphi$ and the separation p between ant1 and ant2:

$$t_D = \frac{D}{c}$$

$$\Delta t = \frac{p \sin \varphi}{c}$$

The signals $S_{RX1}(t)$ and $S_{RX2}(t)$ at ant1 and ant2 are delayed versions of $S_{TX}$ and become:

$$S_{RX1}(t) = \cos(\omega_0(t - t_D - \Delta t) + A_m \sin(\omega_m(t - t_D - \Delta t))) = \cos(\theta_1(t))$$

$$S_{RX2}(t) = \cos(\omega_0(t - t_D) + A_m \sin(\omega_m(t - t_D))) = \cos(\theta_2(t))$$

The method determines the (instantaneous) phase difference between $\theta_1$ and $\theta_2$ to obtain:

$$\theta_1(t) - \theta_2(t) = \omega_0 \Delta t + A_m(\sin(\omega_m(t - t_D)) - \sin(\omega_m(t - t_D - \Delta t)))$$

$$= \omega_0 \Delta t + 2 A_m \sin\left(\frac{\omega_m \Delta t}{2}\right) \cos\left(\omega_m(t - t_D) - \frac{\omega_m \Delta t}{2}\right)$$

If there is no phase modulation, ($\omega_m = 0$), the phase difference would be based on the CW carrier of $\omega_0$ only with $\theta_1(t) - \theta_2(t) = \omega_0 \Delta t$. The error e when phase modulation is introduced, is represented by the second term in the formula above:

$$e = 2 A_m \sin\left(\frac{\omega_m \Delta t}{2}\right) \cos\left(\omega_m(t - t_D) - \frac{\omega_m \Delta t}{2}\right)$$

This error e changes over time as a cosine with a rate of $\omega_m$.

An estimate of this error can be made. Since $\omega_m \Delta t \ll 1$, we find that $$\sin\left(\frac{\omega_m \Delta t}{2}\right) \approx \frac{\omega_m \Delta t}{2} \ll 1.$$

Therefore, the error $e_{max}$ in $\theta_1$-$\theta_2$ caused by the phase modulation is maximally $$e_{max} \leq A_m \omega_m \Delta t$$

As $A_m$ is in the range of 10-20 radians and $\omega_m$ is five orders of magnitude smaller than $\omega_0$, the fractional error is in the order of 1e-4. This error is small enough that it can be ignored in the angle measurement.

Figure 14:
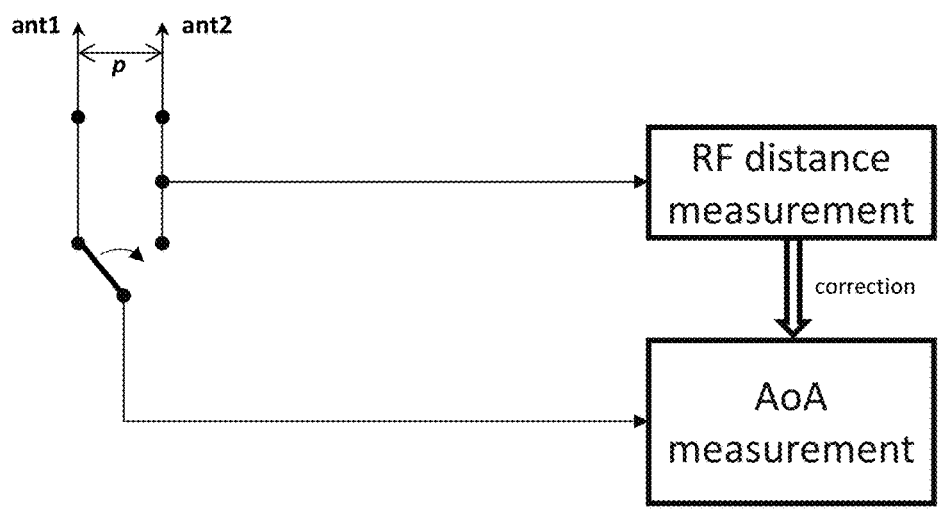
FIG. 14 illustrates a setup for phase modulated compensation in an AoA measurement.

As mentioned before, the error could be compensated for if first PM demodulation is done in the receiver and the result is used in correcting $\theta_1$-$\theta_2$. Yet, with the preferred parameter settings for the distance measurement, the error so small, that in practice, error compensation is not required. If the parameter settings are different such that compensation will be required, the suitable setup is shown in FIG. 14. FIG. 14 illustrates a setup for PM compensation in an AoA measurement.

Figure 15:
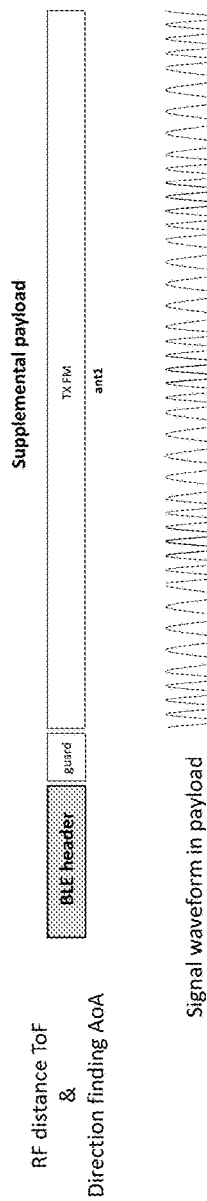
FIG. 15 illustrates a packet format used by a base to perform single mode RF distance and AoA measurement.

For the distance and angle measurement, only a single packet needs to be used, which is illustrated in FIG. 15. FIG. 15 illustrates a packet format used by a base 2 to perform single mode RF distance and AoA measurement. It is the same packet as was previously used for the distance measurement only.

Figure 16:
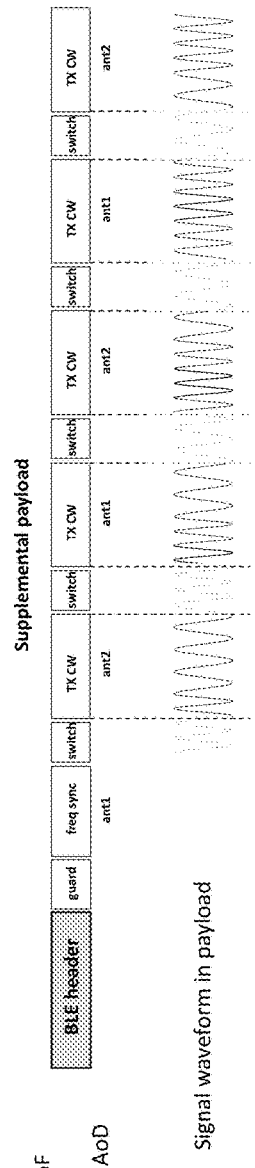
FIG. 16 illustrates a packet format used by a base to perform single mode RF distance and AoD measurement.

FIG. 16 illustrates a packet format used by a base 2 to perform single mode RF distance and AoD measurement. In case of AoD, the payload is segmented: each segment is transmitted on a different antenna element. In between the segments, there is the TRX switching time to select a different the antenna element. Also in this case, a single packet can be used by the base 2 for distance and AoD measurement. Care must be taken that the PM signal is continuous in phase over the segments in such a way that that it ignores the TRX switching times. A detailed illustration is shown in FIG. 16. Preferably, the switching windows are short compared to the segment windows. If the switching times are short with respect to the (phase lock) loop bandwidth used during the RF distance measurement, the PLL in user mobile device 4 will remain in lock thus not disturbing the distance measurement. Note that the return signal from user mobile device 4 to base 2 can make use of the packet format as was shown in FIG. 15.

In various embodiments, the techniques of FIGS. 8-10 and FIGS. 17-18 discussed below may be implemented as sequences of instructions executed by one or more electronic systems. For example, the electronic systems may be base 2 and mobile device 4, both of which may store and receive the instructions.

Figure 8A:
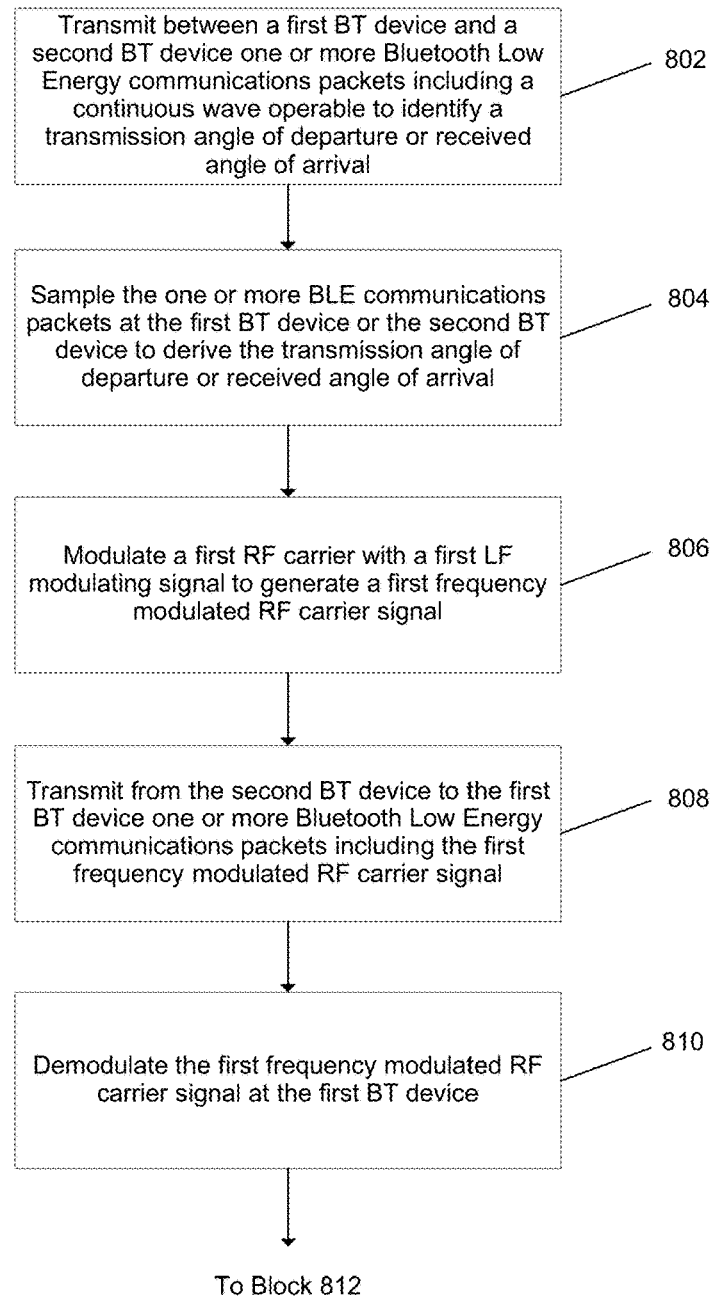
FIGS. 8A-8B are a flow diagram illustrating determining location of a Bluetooth device in one example.
Figure 8B:
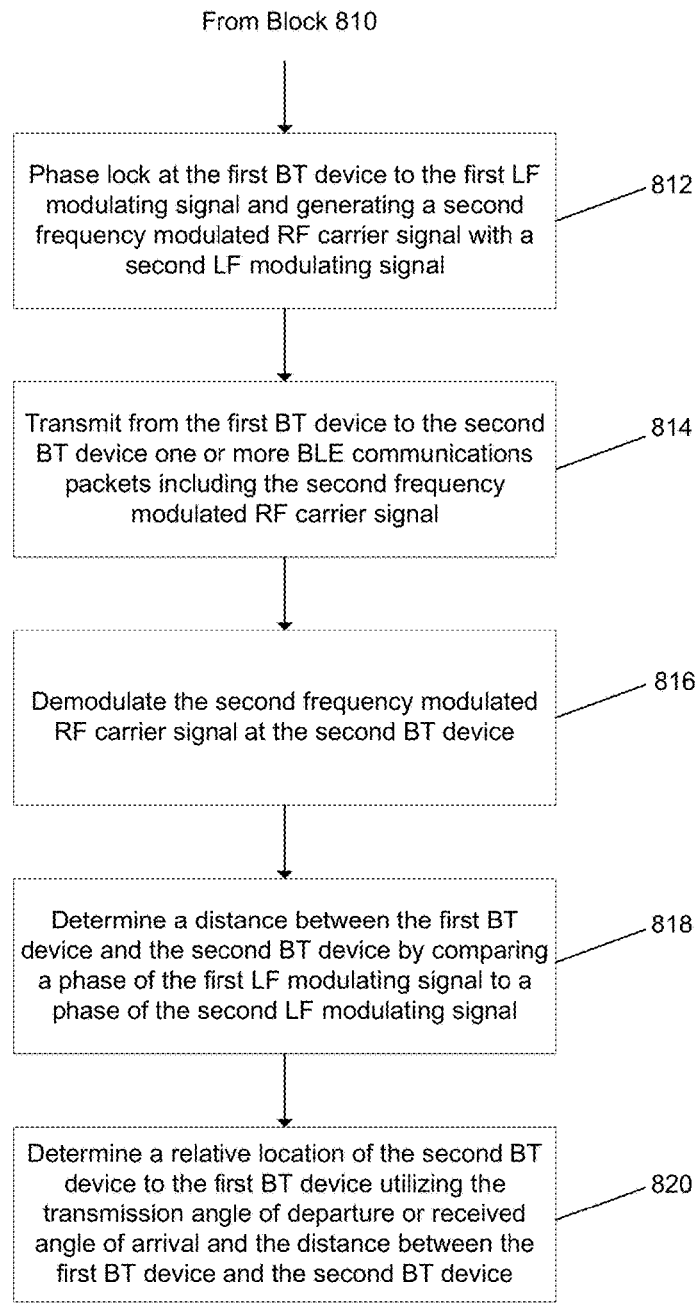

FIGS. 8A-8B are a flow diagram illustrating determining location of a Bluetooth device in one example. At block 802, between a first Bluetooth device and a second Bluetooth device one or more BLE communications packets are transmitted including a continuous wave operable to identify a transmission AoD or received AoA. In one example, the first Bluetooth device is a base device and the second Bluetooth device is a user mobile wireless device. In one example, the first Bluetooth device is a user mobile wireless device and the second Bluetooth device is a base device. In one example, the one or more BLE communications packets including the continuous wave transmitted from at least a first antenna and a second antenna, the first antenna and the second antenna switched during transmission of the continuous wave. In one example, the one or more BLE communications packets are transmitted from the first Bluetooth device to the second Bluetooth device, whereby the second Bluetooth device samples the received packets to derive the transmission AoD from the first Bluetooth device or AoA at the second Bluetooth device.

At block 804, the received one or more BLE communications packets are sampled at the first Bluetooth device or the second Bluetooth device to derive the transmission AoD or received AoA. In one example, the sampling includes receiving the continuous wave at a first antenna and a second antenna, the first antenna and the second antenna switched during receipt of the continuous wave.

At block 806, a first RF carrier is modulated with a first low frequency modulating signal to generate a first frequency modulated RF carrier signal. In one example, the first low frequency modulating signal is a 100-200 kHz signal.

At block 808, the one or more BLE communications packets including the first frequency modulated RF carrier signal are transmitted from the second Bluetooth device to the first Bluetooth device. At block 810, the first frequency modulated RF carrier signal is demodulated at the first Bluetooth device.

At block 812, the first Bluetooth device is phase locked to the first low frequency modulating signal and a second frequency modulated RF carrier signal is generated with a second low frequency modulating signal. For example, a voltage controlled oscillator is phase locked at the first Bluetooth device to the first low frequency modulating signal. A phase of the first low frequency modulating signal is stored in the voltage controlled oscillator that is phase locked to the first low frequency modulating signal. A second RF carrier is modulated with a second low frequency modulating signal utilizing the phase stored in the voltage controlled oscillator at the first Bluetooth device to generate a second frequency modulated RF carrier signal. In one example, the second low frequency modulating signal is a 100-200 kHz signal.

At block 814, one or more BLE communications packets including the second frequency modulated RF carrier signal are transmitted from the first Bluetooth device to the second Bluetooth device. At block 816, the second frequency modulated RF carrier signal is demodulated at the second Bluetooth device. In one example, the continuous wave, the first frequency modulated RF carrier signal, and the second frequency modulated RF carrier signal are transmitted in supplemental payloads of the one or more BLE communications packets.

At block 818, a distance between the first Bluetooth device and the second Bluetooth device is determined by comparing a phase of the first low frequency modulating signal to a phase of the second low frequency modulating signal. At block 820, a relative location of the second Bluetooth device to the first Bluetooth device is determined utilizing the transmission AoD or received AoA and the distance between the first Bluetooth device and the second Bluetooth device.

Figure 9A:
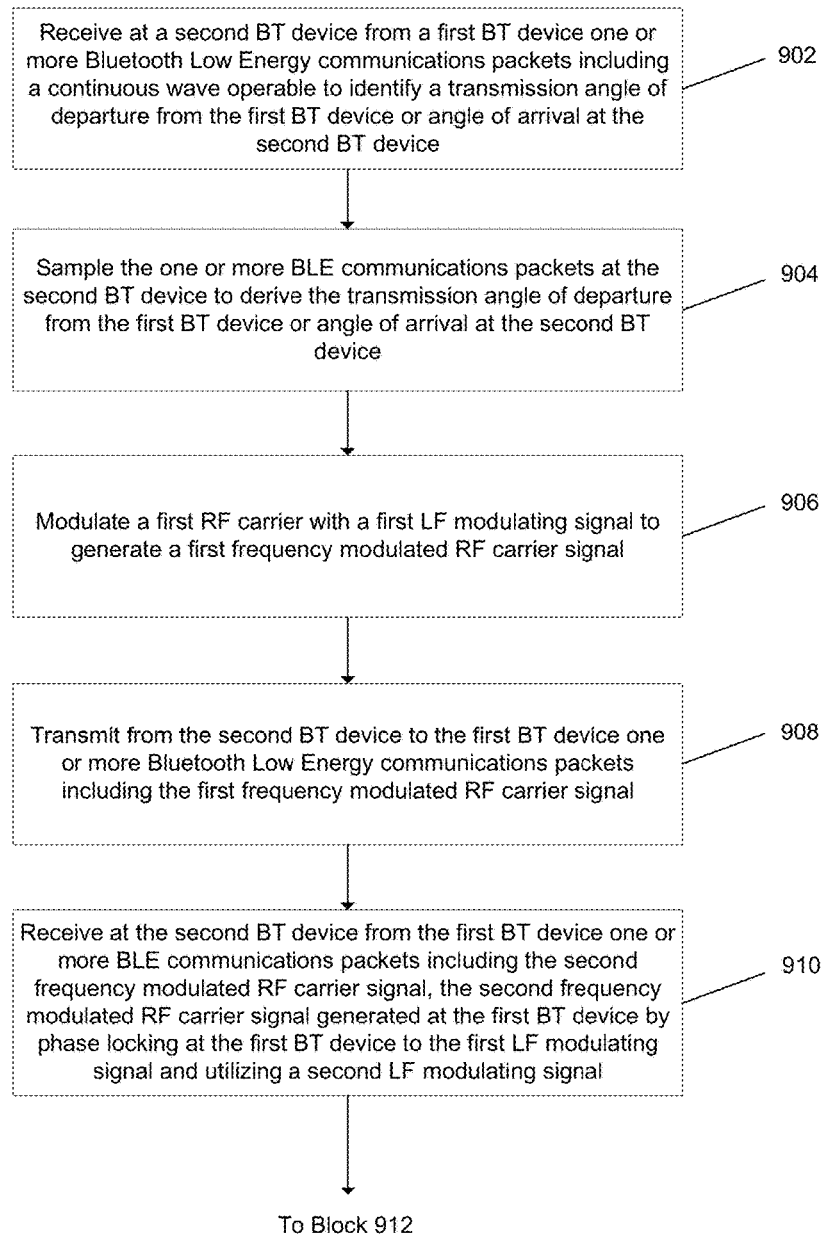
FIGS. 9A-9B are a flow diagram illustrating determining location of a Bluetooth device in a further example.
Figure 9B:
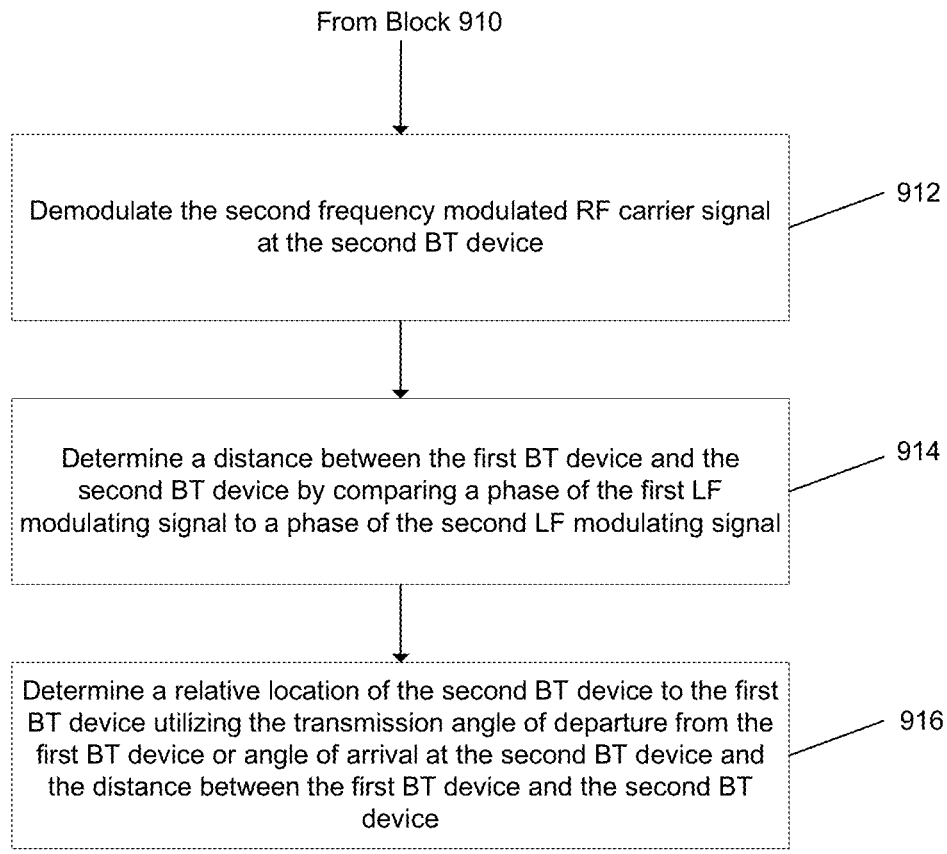

FIGS. 9A-9B are a flow diagram illustrating determining location of a Bluetooth device in a further example. At block 902, one or more BLE communications packets including a continuous wave are received at a second Bluetooth device from a first Bluetooth device, the packets operable to identify a transmission AoD from the first Bluetooth device or AoA at the second Bluetooth device. In one example, the first Bluetooth device is a base device and the second Bluetooth device is a user mobile wireless device. In one example, the first Bluetooth device is a user mobile wireless device and the second Bluetooth device is a base device. In one example, the one or more BLE communications packets includes the continuous wave transmitted from at least a first antenna and a second antenna, the first antenna and the second antenna switched during transmission of the continuous wave.

At block 904, the one or more BLE communications packets are sampled at the second Bluetooth device to derive the transmission AoD from the first Bluetooth device or AoA at the second Bluetooth device. For example, the sampling includes receiving the continuous wave at a first antenna and a second antenna, the first antenna and the second antenna switched during receipt of the continuous wave.

At block 906, a first RF carrier is modulated with a first low frequency modulating signal to generate a first frequency modulated RF carrier signal. In one example, the first low frequency modulating signal is a 100-200 kHz signal. At block 908, one or more BLE communications packets including the first frequency modulated RF carrier signal are transmitted from the second Bluetooth device to the first Bluetooth device.

At block 910, one or more BLE communications packets including the second frequency modulated RF carrier signal are received at the second Bluetooth device from the first Bluetooth device, the second frequency modulated RF carrier signal generated at the first Bluetooth device by phase locking at the first Bluetooth device to the first low frequency modulating signal and utilizing a second low frequency modulating signal. In one example, the second low frequency modulating signal is a 100-200 kHz signal. In one example, the continuous wave, the first frequency modulated RF carrier signal, and the second frequency modulated RF carrier signal are transmitted in supplemental payloads of the one or more BLE communications packets. At block 912, the second frequency modulated RF carrier signal is demodulated at the second Bluetooth device.

At block 914, a distance between the first Bluetooth device and the second Bluetooth device is determined by comparing a phase of the first low frequency modulating signal to a phase of the second low frequency modulating signal. At block 916, a relative location of the second Bluetooth device to the first Bluetooth device is determined utilizing the transmission AoD from the first Bluetooth device or AoA at the second Bluetooth device and the distance between the first Bluetooth device and the second Bluetooth device.

Figure 10A:
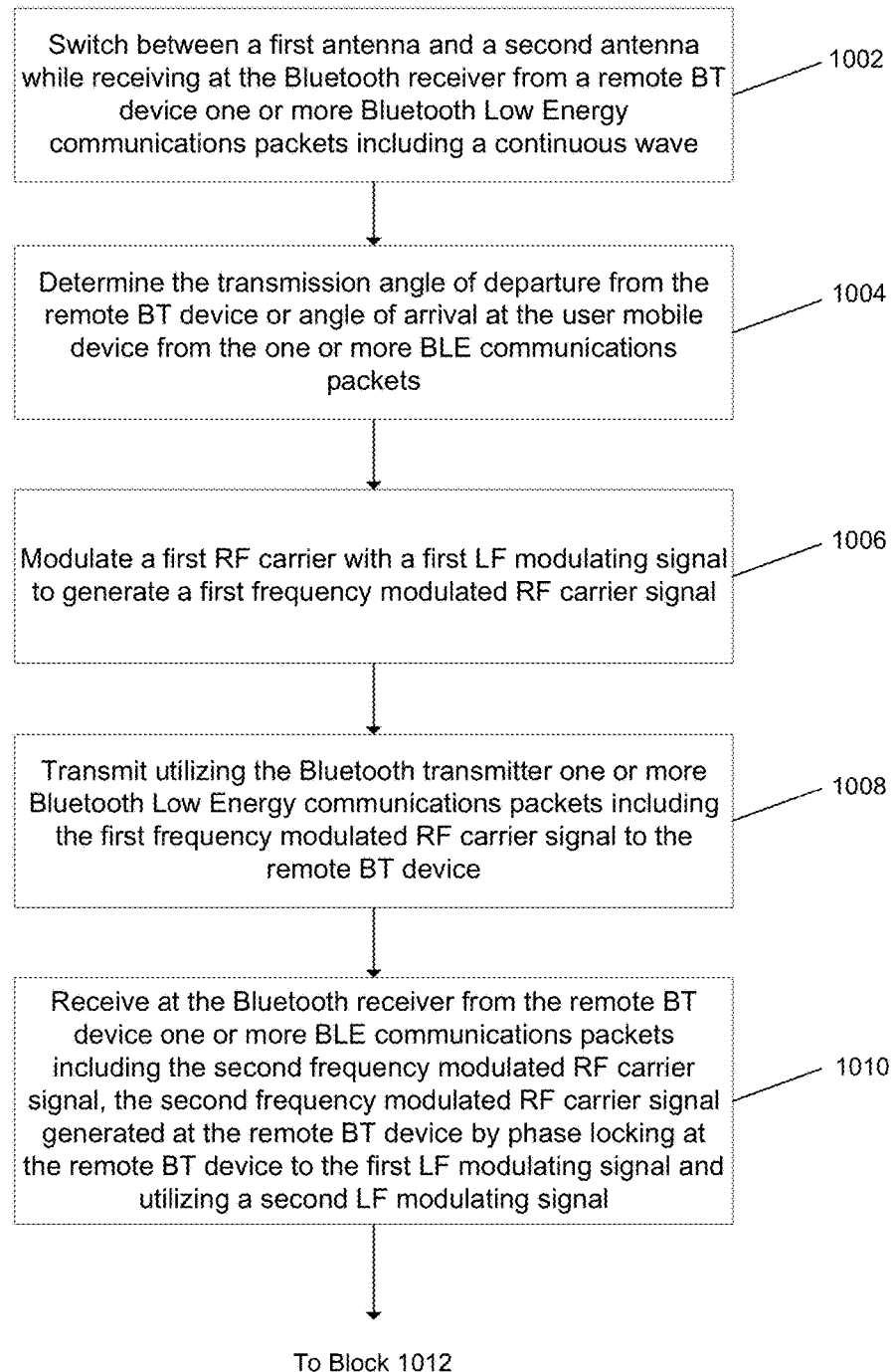
FIGS. 10A-10B are a flow diagram illustrating determining location of a Bluetooth device in a further example.
Figure 10B:
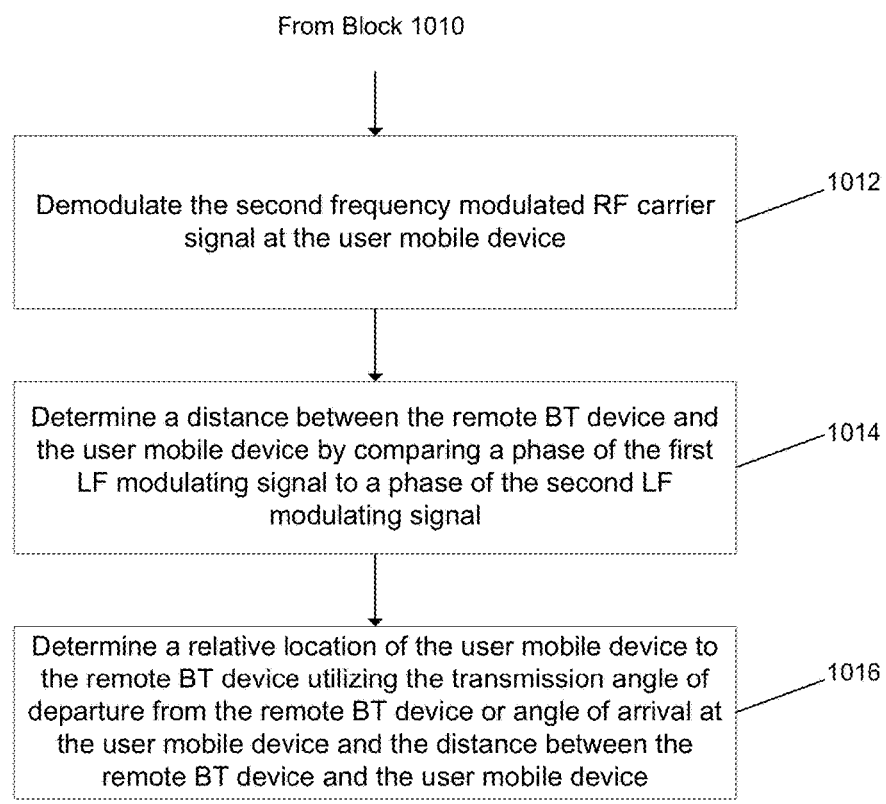

FIGS. 10A-10B are a flow diagram illustrating determining location of a Bluetooth device in a further example. At block 1002, a first antenna and a second antenna are switched while receiving at a Bluetooth receiver from a remote Bluetooth device one or more BLE communications packets including a continuous wave. In one example, the remote Bluetooth device is a base device and the user mobile device is a wireless Bluetooth headset.

At block 1004, a transmission AoD from the remote Bluetooth device or AoA at the user mobile device is determined from the one or more BLE communications packets. At block 1006, a first RF carrier is modulated with a first low frequency modulating signal to generate a first frequency modulated RF carrier signal. In one example, the first low frequency modulating signal is a 100-200 kHz signal.

At block 1008, one or more BLE communications packets including the first frequency modulated RF carrier signal are transmitted to the remote Bluetooth device utilizing a Bluetooth transmitter. At block 1010, one or more BLE communications packets including the second frequency modulated RF carrier signal are received at the Bluetooth receiver from the remote Bluetooth device, the second frequency modulated RF carrier signal generated at the remote Bluetooth device by phase locking at the remote Bluetooth device to the first low frequency modulating signal and utilizing a second low frequency modulating signal. In one example, the second low frequency modulating signal is a 100-200 kHz signal. In one example, the continuous wave, the first frequency modulated RF carrier signal, and the second frequency modulated RF carrier signal are transmitted in supplemental payloads of the one or more BLE communications packets. At block 1012, the second frequency modulated RF carrier signal is demodulated at the user mobile device.

At block 1014, a distance between the remote Bluetooth device and the user mobile device is determined by comparing a phase of the first low frequency modulating signal to a phase of the second low frequency modulating signal. At block 1016, a relative location of the user mobile device to the remote Bluetooth device is determined utilizing the transmission AoD from the remote Bluetooth device or AoA at the user mobile device and the distance between the remote Bluetooth device and the user mobile device.

Figure 17A:
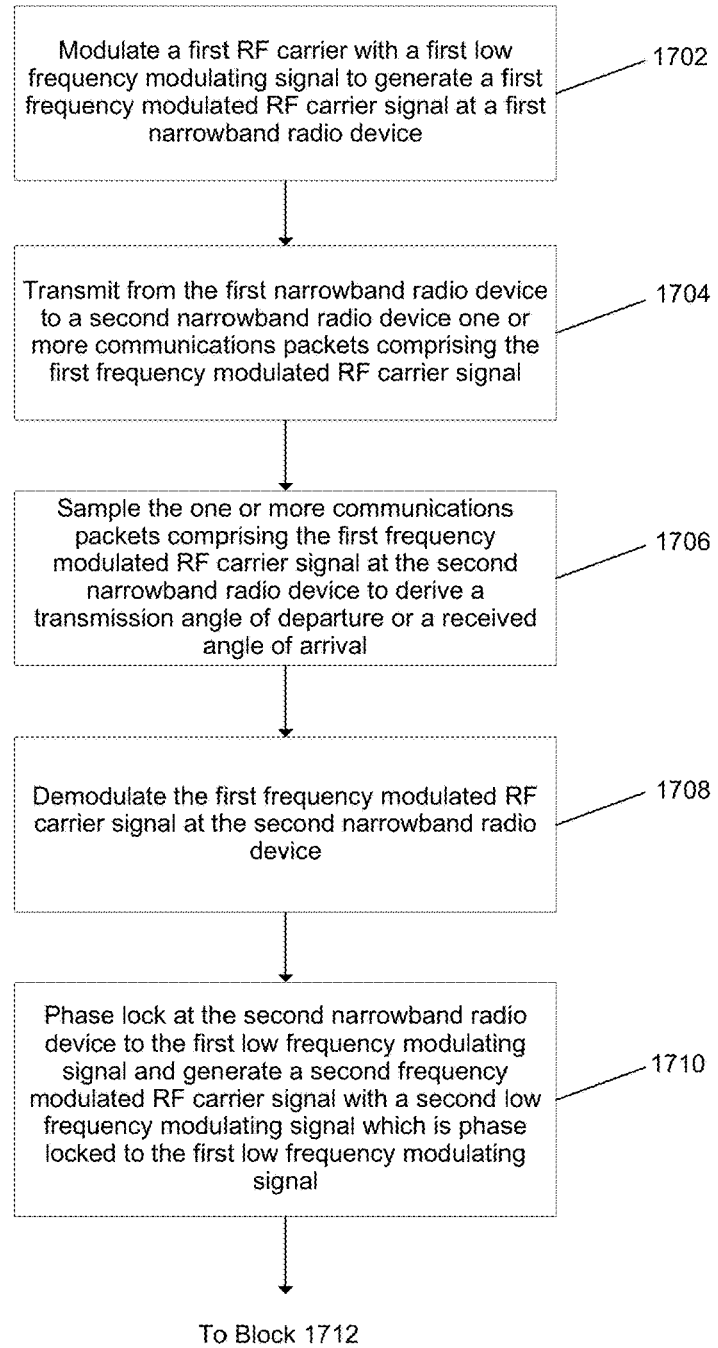
FIGS. 17A-17B are a flow diagram illustrating determining location of a Bluetooth device in a single-mode distance and angle detection example.
Figure 17B:
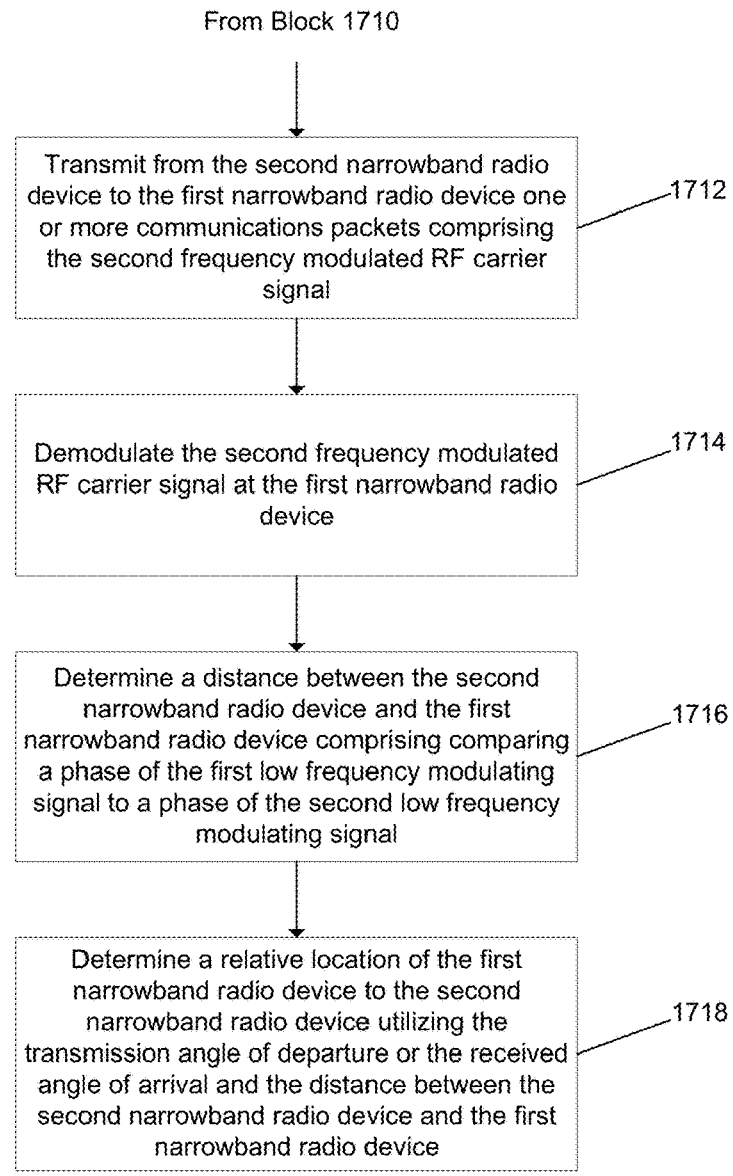

FIGS. 17A-17B are a flow diagram illustrating determining location of a Bluetooth device in a single-mode distance and angle detection example. At block 1702, a first RF carrier is modulated with a first low frequency modulating signal to generate a first frequency modulated RF carrier signal at a first narrowband radio device. At block 1704, one or more communications packets comprising the first frequency modulated RF carrier signal are transmitted from the first narrowband radio device to a second narrowband radio device.

In one example, the first narrowband radio device is a first Bluetooth device and the second narrowband radio device is a second Bluetooth device. In one example, the first narrowband radio device is a base device and the second narrowband radio device is a user mobile wireless device. In one example, the first narrowband radio device is a user mobile wireless device and the second narrowband radio device is a base device. In one example, the first low frequency modulating signal includes a 100-200 kHz signal and the second low frequency modulating signal includes a 100-200 kHz signal. In one example, the one or more communications packets comprising the first frequency modulated RF carrier signal comprise Bluetooth Low Energy communications packets.

At block 1706, the one or more communications packets comprising the first frequency modulated RF carrier signal are sampled at the second narrowband radio device to derive a transmission angle of departure or a received angle of arrival. At block 1708, the first frequency modulated RF carrier signal is demodulated at the second narrowband radio device. At block 1710, the second narrowband radio device is phased locked to the first low frequency modulating signal, and a second frequency modulated RF carrier signal is generated with a second low frequency modulating signal which is phase locked to the first low frequency modulating signal.

At block 1712, one or more communications packets comprising the second frequency modulated RF carrier signal are transmitted from the second narrowband radio device to the first narrowband radio device. At block 1714, the second frequency modulated RF carrier signal is demodulated at the first narrowband radio device.

At block 1716, a distance between the second narrowband radio device and the first narrowband radio device is determined including comparing a phase of the first low frequency modulating signal to a phase of the second low frequency modulating signal. At block 1718, a relative location of the first narrowband radio device to the second narrowband radio device is determined utilizing the transmission angle of departure or the received angle of arrival and the distance between the second narrowband radio device and the first narrowband radio device.

Figure 18A:
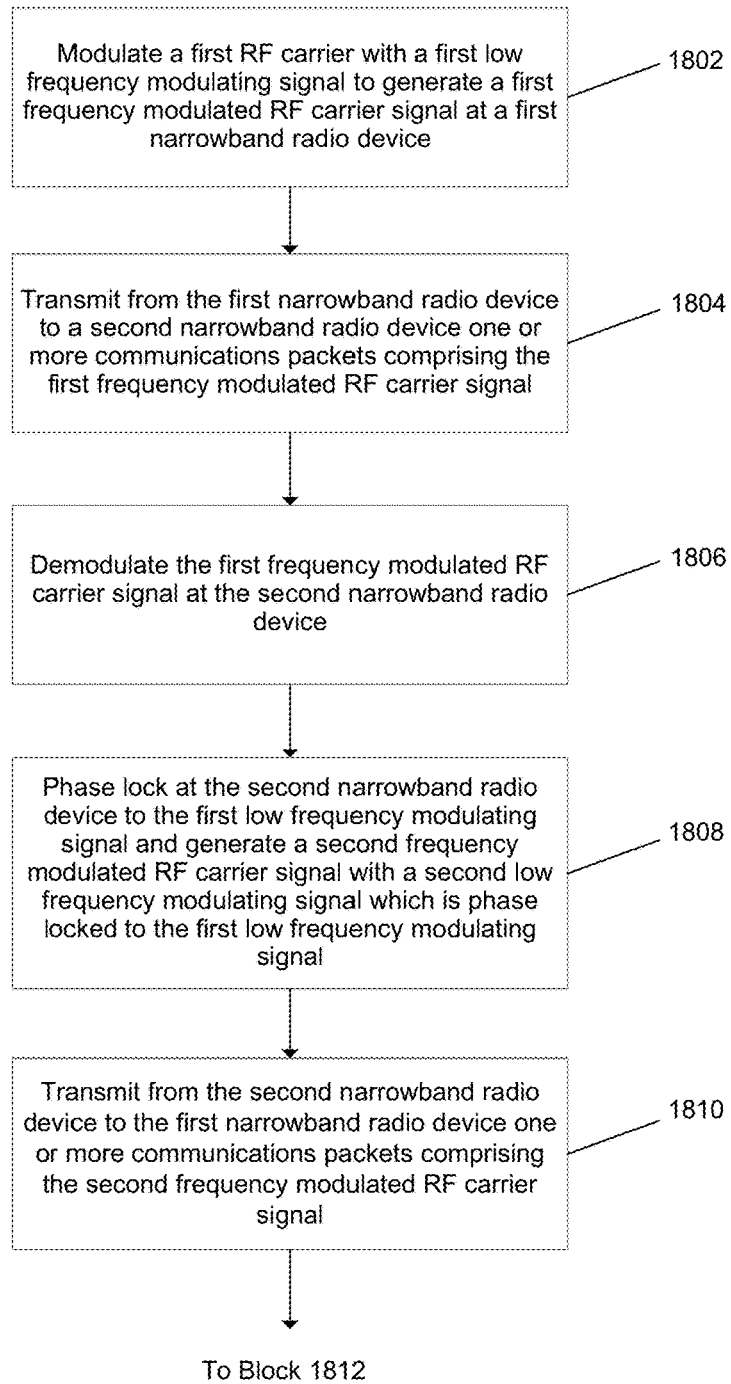
FIGS. 18A-18B are a flow diagram illustrating determining location of a Bluetooth device in a further example of single-mode distance and angle detection.
Figure 18B:
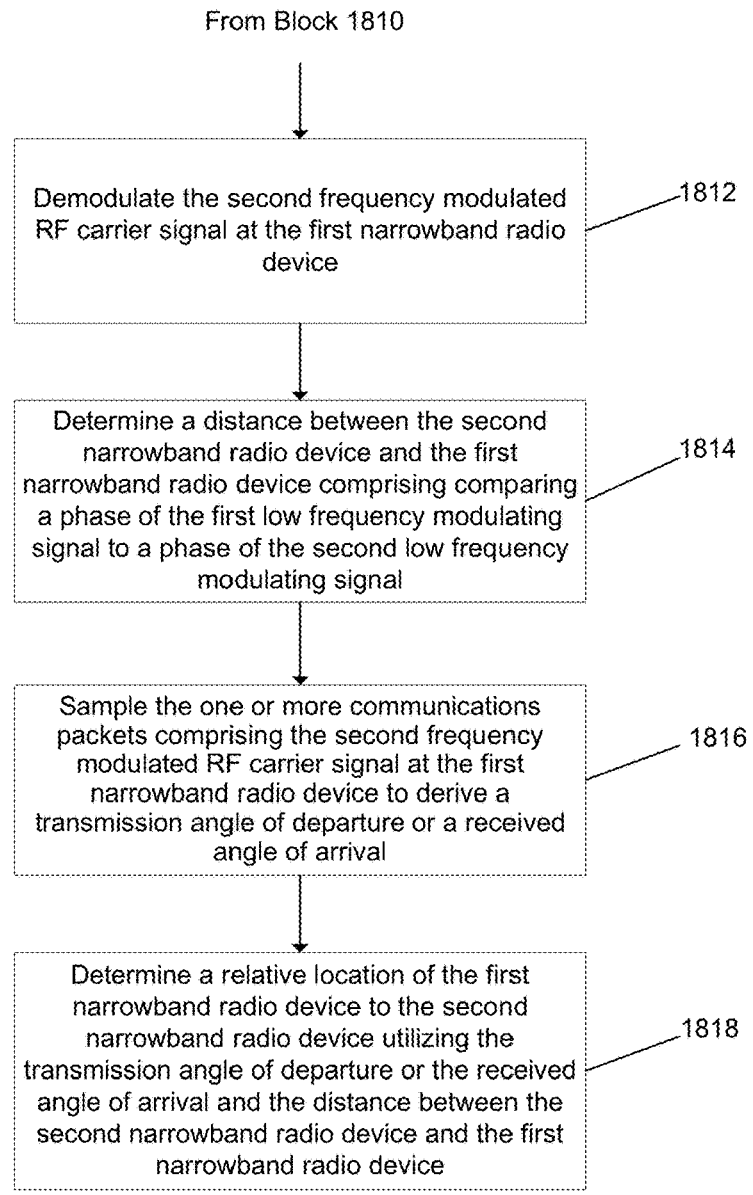

FIGS. 18A-18B are a flow diagram illustrating determining location of a Bluetooth device in a further example of single-mode distance and angle detection. At block 1802, a first RF carrier is modulated with a first low frequency modulating signal to generate a first frequency modulated RF carrier signal at a first narrowband radio device. At block 1804, one or more communications packets comprising the first frequency modulated RF carrier signal are transmitted from the first narrowband radio device to a second narrowband radio device.

In one example, the first narrowband radio device is a first Bluetooth device and the second narrowband radio device is a second Bluetooth device. In one example, the first narrowband radio device is a base device and the second narrowband radio device is a user mobile wireless device. In one example, the first narrowband radio device is a user mobile wireless device and the second narrowband radio device is a base device. In one example, the first low frequency modulating signal includes a 100-200 kHz signal and the second low frequency modulating signal includes a 100-200 kHz signal. In one example, the one or more communications packets comprising the first frequency modulated RF carrier signal comprise Bluetooth Low Energy communications packets.

At block 1806, the first frequency modulated RF carrier signal is demodulated at the second narrowband radio device. At block 1808, the second narrowband radio device is phased locked to the first low frequency modulating signal, and a second frequency modulated RF carrier signal is generated with a second low frequency modulating signal which is phase locked to the first low frequency modulating signal.

At block 1810, one or more communications packets comprising the second frequency modulated RF carrier signal are transmitted from the second narrowband radio device to the first narrowband radio device. At block 1812, the second frequency modulated RF carrier signal is demodulated at the first narrowband radio device.

At block 1814, a distance between the second narrowband radio device and the first narrowband radio device is determined including comparing a phase of the first low frequency modulating signal to a phase of the second low frequency modulating signal. At block 1816, the one or more communications packets comprising the second frequency modulated RF carrier signal are sampled at the first narrowband radio device to derive a transmission angle of departure or a received angle of arrival.

At block 1818, a relative location of the first narrowband radio device to the second narrowband radio device is determined utilizing the transmission angle of departure or the received angle of arrival and the distance between the second narrowband radio device and the first narrowband radio device.

While the exemplary embodiments of the present invention are described and illustrated herein, it will be appreciated that they are merely illustrative and that modifications can be made to these embodiments without departing from the spirit and scope of the invention. For example, although certain embodiments are described in reference to indoor use cases, further examples are not so limited. Although embodiments are described in reference to Bluetooth, additional narrowband protocols may be utilized in further examples. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
transmitting between a first Bluetooth device and a second Bluetooth device one or more Bluetooth Low Energy communications packets comprising a continuous wave configured to identify a transmission angle of departure or received angle of arrival;
sampling the one or more Bluetooth Low Energy communications packets at the first Bluetooth device or the second Bluetooth device to derive the transmission angle of departure or received angle of arrival;
modulating a first RF carrier with a first low frequency modulating signal to generate a first frequency modulated RF carrier signal;
transmitting from the second Bluetooth device to the first Bluetooth device one or more Bluetooth Low Energy communications packets comprising the first frequency modulated RF carrier signal;
demodulating the first frequency modulated RF carrier signal at the first Bluetooth device;
phase locking at the first Bluetooth device to the first low frequency modulating signal and generating a second frequency modulated RF carrier signal with a second low frequency modulating signal;
transmitting from the first Bluetooth device to the second Bluetooth device one or more Bluetooth Low Energy communications packets comprising the second frequency modulated RF carrier signal;
demodulating the second frequency modulated RF carrier signal at the second Bluetooth device;
determining a distance between the first Bluetooth device and the second Bluetooth device comprising comparing a phase of the first low frequency modulating signal to a phase of the second low frequency modulating signal; and
determining a relative location of the second Bluetooth device to the first Bluetooth device utilizing the transmission angle of departure or received angle of arrival and the distance between the first Bluetooth device and the second Bluetooth device.

2. The method of claim 1, wherein phase locking at the first Bluetooth device to the first low frequency modulating signal and generating the second frequency modulated RF carrier signal with the second low frequency modulating signal comprises:
  phase locking a voltage controlled oscillator at the first Bluetooth device to the first low frequency modulating signal;
  storing a phase of the first low frequency modulating signal in the voltage controlled oscillator that is phase locked to the first low frequency modulating signal; and
  modulating a second RF carrier with the second low frequency modulating signal utilizing the phase stored in the voltage controlled oscillator at the first Bluetooth device to generate the second frequency modulated RF carrier signal.

3. The method of claim 1, wherein the first Bluetooth device comprises a base device and the second Bluetooth device comprises a user mobile wireless device.

4. The method of claim 1, wherein the first Bluetooth device comprises a user mobile wireless device and the second Bluetooth device comprises a base device.

5. The method of claim 1, wherein the one or more Bluetooth Low Energy communications packets comprises the continuous wave transmitted from at least a first antenna and a second antenna, the first antenna and the second antenna switched during transmission of the continuous wave.

6. The method of claim 1, wherein sampling the one or more Bluetooth Low Energy communications packets at the first Bluetooth device or the second Bluetooth device to derive the transmission angle of departure or received angle of arrival comprises receiving the continuous wave at a first antenna and a second antenna, the first antenna and the second antenna switched during receipt of the continuous wave.

7. The method of claim 1, wherein the continuous wave, the first frequency modulated RF carrier signal, and the second frequency modulated RF carrier signal are transmitted in supplemental payloads of the one or more Bluetooth Low Energy communications packets.

8. The method of claim 1, wherein:
  transmitting between the first Bluetooth device and the second Bluetooth device comprises transmitting from the first Bluetooth device to the second Bluetooth device the one or more Bluetooth Low Energy communications packets comprising a continuous wave configured to identify a transmission angle of departure from the first Bluetooth device or angle of arrival at the second Bluetooth device, and
  sampling the one or more Bluetooth Low Energy communications packets at the first Bluetooth device or the second Bluetooth device comprises sampling the one or more Bluetooth Low Energy communications packets at the second Bluetooth device to derive the transmission angle of departure from the first Bluetooth device or angle of arrival at the second Bluetooth device.

9. The method of claim 1, wherein the first low frequency modulating signal comprises a 100-200 kHz signal and the second low frequency modulating signal comprises a 100-200 kHz signal.

10. A method comprising:
  receiving at a second narrowband radio device from a first narrowband radio device one or more narrowband radio communications packets comprising a continuous wave configured to identify a transmission angle of departure from the first narrowband radio device or angle of arrival at the second narrowband radio device;
  sampling the one or more narrowband radio Low Energy communications packets at the second narrowband radio device to derive the transmission angle of departure from the first narrowband radio device or angle of arrival at the second narrowband radio device;
  modulating a first RF carrier with a first low frequency modulating signal to generate a first frequency modulated RF carrier signal;
  transmitting from the second narrowband radio device to the first narrowband radio device one or more narrowband radio Low Energy communications packets comprising the first frequency modulated RF carrier signal;
  receiving at the second narrowband radio device from the first narrowband radio device one or more narrowband radio communications packets comprising a second frequency modulated RF carrier signal, the second frequency modulated RF carrier signal generated at the first narrowband radio device by phase locking at the first narrowband radio device to the first low frequency modulating signal and utilizing a second low frequency modulating signal;
  demodulating the second frequency modulated RF carrier signal at the second narrowband radio device;
  determining a distance between the first narrowband radio device and the second narrowband radio device comprising comparing a phase of the first low frequency modulating signal to a phase of the second low frequency modulating signal; and
  determining a relative location of the second narrowband radio device to the first narrowband radio device utilizing the transmission angle of departure from the first narrowband radio device or angle of arrival at the second narrowband radio device and the distance between the first narrowband radio device and the second narrowband radio device.

11. The method of claim 10, wherein the first narrowband radio device comprises a base device and the second narrowband radio device comprises a user mobile wireless device.

12. The method of claim 10, wherein the first narrowband radio device comprises a user mobile wireless device and the second narrowband radio device comprises a base device.

13. The method of claim 10, wherein the one or more narrowband radio Low Energy communications packets comprises the continuous wave transmitted from at least a first antenna and a second antenna, the first antenna and the second antenna switched during transmission of the continuous wave.

14. The method of claim 10, wherein sampling the one or more narrowband radio Low Energy communications packets at the second narrowband radio device to derive the transmission angle of departure from the first narrowband radio device or angle of arrival at the second narrowband radio device comprises receiving the continuous wave at a first antenna and a second antenna, the first antenna and the second antenna switched during receipt of the continuous wave.

15. The method of claim 10, wherein the continuous wave, the first frequency modulated RF carrier signal, and the second frequency modulated RF carrier signal are transmitted in supplemental payloads of the one or more narrowband radio Low Energy communications packets.

16. The method of claim 10, wherein the first low frequency modulating signal comprises a 100-200 kHz signal and the second low frequency modulating signal comprises a 100-200 kHz signal.

17. The method of claim 10, wherein the first narrowband radio devices comprises a first Bluetooth device and the second narrowband radio device comprises a second Bluetooth device.

18. A mobile device comprising:
- a user interface;
- a power source;
- a first antenna;
- a second antenna;
- a Bluetooth transmitter configured to transmit Bluetooth communications packets on the first antenna or the second antenna;
- a Bluetooth receiver configured to receive Bluetooth communications packets on the first antenna or the second antenna;
- a processor;
- a memory comprising a location application executable by the processor to perform operations comprising;
  - switching between the first antenna and the second antenna while receiving at the Bluetooth receiver from a remote Bluetooth device one or more Bluetooth Low Energy communications packets comprising a continuous wave;
  - determining a transmission angle of departure from the remote Bluetooth device or angle of arrival at the mobile device from the one or more Bluetooth Low Energy communications packets;
  - modulating a first RF carrier with a first low frequency modulating signal to generate a first frequency modulated RF carrier signal;
  - transmitting utilizing the Bluetooth transmitter one or more Bluetooth Low Energy communications packets comprising the first frequency modulated RF carrier signal to the remote Bluetooth device;
  - receiving at the Bluetooth receiver from the remote Bluetooth device one or more Bluetooth Low Energy communications packets comprising a second frequency modulated RF carrier signal, the second frequency modulated RF carrier signal generated at the remote Bluetooth device by phase locking at the remote Bluetooth device to the first low frequency modulating signal and utilizing a second low frequency modulating signal;
  - demodulating the second frequency modulated RF carrier signal at the mobile device;
  - determining a distance between the remote Bluetooth device and the mobile device comprising comparing a phase of the first low frequency modulating signal to a phase of the second low frequency modulating signal; and
  - determining a relative location of the mobile device to the remote Bluetooth device utilizing the transmission angle of departure from the remote Bluetooth device or angle of arrival at the mobile device and the distance between the remote Bluetooth device and the mobile device.

19. The mobile device of claim 18, wherein the remote Bluetooth device comprises a base device and the mobile device comprises a wireless Bluetooth headset.

20. The mobile device of claim 18, wherein the continuous wave, the first frequency modulated RF carrier signal, and the second frequency modulated RF carrier signal are transmitted in supplemental payloads of the one or more Bluetooth Low Energy communications packets.

21. The mobile device of claim 18, wherein the first low frequency modulating signal comprises a 100-200 kHz signal and the second low frequency modulating signal comprises a 100-200 kHz signal.

* * * * *